United States Patent
Ravichandran et al.

(10) Patent No.: US 11,424,977 B2
(45) Date of Patent: *Aug. 23, 2022

(54) METHOD AND SYSTEM FOR PERFORMING EFFECTIVE ORCHESTRATION OF COGNITIVE FUNCTIONS IN DISTRIBUTED HETEROGENEOUS COMMUNICATION NETWORK

(71) Applicant: Wipro Limited, Bangalore (IN)

(72) Inventors: Ramya Ravichandran, Chennai (IN); Krishna Moorthy Manoharan, Thuraiyur (IN); Swaminathan Seetharaman, Chennai (IN)

(73) Assignee: Wipro Limited, Bangalore (IN)

( * ) Notice: Subject to any disclaimer, the term of this patent is extended or adjusted under 35 U.S.C. 154(b) by 44 days.

This patent is subject to a terminal disclaimer.

(21) Appl. No.: 16/358,751

(22) Filed: Mar. 20, 2019

(65) Prior Publication Data

US 2020/0186411 A1 Jun. 11, 2020

(30) Foreign Application Priority Data

Dec. 10, 2018 (IN) .............................. 201841046658

(51) Int. Cl.
*H04L 12/24* (2006.01)
*H04L 41/0659* (2022.01)
(Continued)

(52) U.S. Cl.
CPC ...... *H04L 41/0659* (2013.01); *H04L 41/0618* (2013.01); *H04L 41/0668* (2013.01); *H04L 41/0677* (2013.01); *H04L 41/5009* (2013.01)

(58) Field of Classification Search
CPC ............. H04L 41/0659; H04L 41/0668; H04L 41/5009; H04L 41/0618; H04L 41/0677
See application file for complete search history.

(56) References Cited

U.S. PATENT DOCUMENTS 8,738,972 B1 * 5/2014 Bakman .............. G06F 11/3433
  714/47.2
10,320,698 B1 * 6/2019 Allen ...................... H04L 47/70
(Continued)

OTHER PUBLICATIONS

Xu, Lei, Assem, Haytham, Yahia, Imen Grida Ben, Buda, Teodora Sandra, et al. "CogNet: A network management architecture featuring cognitive capabilities;" Jun. 27, 2016, https://ieeexplore.ieee.org/abstract/document/7561056 (Year: 2016).*

(Continued)

*Primary Examiner* — Ranodhi Serrao
(74) *Attorney, Agent, or Firm* — Finnegan, Henderson, Farabow, Garrett & Dunner, LLP

(57) ABSTRACT

This disclosure relates to method and system for performing effective orchestration of cognitive functions (CFs) in a distributed heterogeneous communication network. In one embodiment, the method may include determining a fault or a performance issue and associated causes, related to a set of network slices in the distributed heterogeneous communication network or a set of services across the set of network slices, using CFs associated with each of the set of services or with each of the set of network slices. The method may further include determining possible resolutions for the fault or the performance issue based on the associated causes, identifying a resolution by evaluating each of the possible resolutions for at least one of a suitability to or an impact on the set of services or the set of network slices, and implementing the resolution on one or more affected network segments of the set of network slices.

18 Claims, 8 Drawing Sheets

(51) Int. Cl.
*H04L 41/0668* (2022.01)
*H04L 41/5009* (2022.01)
*H04L 41/0604* (2022.01)
*H04L 41/0677* (2022.01)

(56) References Cited

U.S. PATENT DOCUMENTS

| | | | | |
|---|---|---|---|---|
| 10,621,003 | B2* | 4/2020 | Valecha | G06F 9/5072 |
| 2004/0148138 | A1* | 7/2004 | Garnett | H04L 43/00 |
| | | | | 702/189 |
| 2008/0208958 | A1* | 8/2008 | Huff | H04L 29/12047 |
| | | | | 709/203 |
| 2011/0219068 | A1* | 9/2011 | Brittenham | G06F 16/00 |
| | | | | 709/204 |
| 2014/0335439 | A1* | 11/2014 | Lee | H01M 8/1086 |
| | | | | 429/492 |
| 2016/0104076 | A1* | 4/2016 | Maheshwari | G06N 20/00 |
| | | | | 706/12 |
| 2016/0353465 | A1* | 12/2016 | Vrzic | H04W 28/0247 |
| 2017/0208487 | A1* | 7/2017 | Ratakonda | H04W 24/04 |
| 2017/0353991 | A1* | 12/2017 | Tapia | H04L 41/0631 |
| 2018/0039914 | A1* | 2/2018 | Menahem | G06N 5/048 |
| 2018/0046477 | A1* | 2/2018 | Aelken | G06F 9/5072 |
| 2018/0143858 | A1* | 5/2018 | Sanjabi | H04L 47/805 |
| 2018/0167312 | A1* | 6/2018 | Liu | H04W 40/244 |
| 2019/0102213 | A1* | 4/2019 | Yousaf | G06F 11/3006 |
| 2019/0104440 | A1* | 4/2019 | Yang | H04W 28/16 |
| 2019/0147068 | A1* | 5/2019 | Tuggle | G06F 16/252 |
| | | | | 707/793 |
| 2019/0164087 | A1* | 5/2019 | Ghibril | G06N 5/02 |
| 2019/0306045 | A1* | 10/2019 | Avdesh Khanna | |
| | | | | H04L 41/0686 |
| 2019/0324822 | A1* | 10/2019 | Gottin | G06F 9/4401 |
| 2020/0007413 | A1* | 1/2020 | Kerpez | H04L 12/4625 |
| 2020/0112489 | A1* | 4/2020 | Scherger | H04L 41/0677 |
| 2020/0186433 | A1* | 6/2020 | Cui | H04L 41/147 |

OTHER PUBLICATIONS

Kafle Ved P., Fukushima Yusuke, Martinez-Julia Pedro, Miyazawa Takaya, et al. "Consideration On Automation of 5G Network Slicing with Machine Learning" Nov. 26, 2018, https://ieeexplore.ieee.org/abstract/document/8597639 (Year: 2018).*

Thomas Ryan W., Friend, Daniel H., Dasilva, Luiz A, Mackenzie, Allen B. et al. "Cognitive Networks: adaptation and learning to achieve end-to-end performance objectives" Dec. 2006, https://ieeexplore.ieee.org/abstract/document/4050101 (Year: 2006).*

Kakalou, Ioanna, Psannis, Kostas E., Krawiec, Piotr, Badea Radu et al. "Cognitive Radio Network and Network Service Chaining toward 5G: Challenges and Requirements" Nov. 17, 2017, https://ieeexplore.ieee.org/abstract/document/8114565 (Year: 2017).*

Ahad, Rafiul Chan Eric, Santos Adriano, "Toward Autonomic Cloud: Automatic Anomaly Detection and Resolution" Oct. 29, 2015, https://ieeexplore.ieee.org/abstract/document/7312155 (Year: 2015).*

Bega Dario, Gramaglia, Marco, Fiore, Marco, Banchs Albert et al. "DeepCog: Optimizing Resource Provisioning in Network Slicing with AI-Based Capacity Forecasting" Dec. 13, 2019, https://ieeexplore.ieee.org/abstract/document/8932440 (Year: 2019).*

Ayoubi, S., et al., "Machine Learning for Cognitive Network Management", IEEE Communications Magazine, Jan. 2018, pp. 158-165.

Macedo., D.F., et al., "The AutoI approach for the orchestration of autonomic networks", Springer; Ann. Telecommun. (2011), pp. 243-255.

ETSI GS NVF-MAN 001 v1.1.1, "NFV Management and Orchestration", ETSI, Dec. 2014, 184 pages.

ETSI GG AFI 002 v1.1.1, "Automatic network engineering for the self-managing Future Internet (AFI): Generic Autonomic Network Architecture", ETSI, Apr. 2013, 167 pages.

* cited by examiner

METHOD AND SYSTEM FOR PERFORMING EFFECTIVE ORCHESTRATION OF COGNITIVE FUNCTIONS IN DISTRIBUTED HETEROGENEOUS COMMUNICATION NETWORK

TECHNICAL FIELD

This disclosure relates generally to communication network, and more particularly to a system and method for performing effective orchestration of cognitive functions (CFs) in a distributed heterogeneous communication network.

BACKGROUND

Various modes of telecommunication have not only revolutionized the way we communicate, but have also changed the way we do business or the way we live our lives. Today, various modes of telecommunication are increasingly used to perform various functions such as streaming multimedia content, playing high definition online games, enabling video calls, and so forth in addition to basic voice calls. As communication networks evolve and rapidly grow in size, heterogeneity, and complexity, it is important for an operator to maintain service level agreement (SLA) as it may have a direct impact on the revenues and customer loyalty in a competitive environment. Further, the operator's objective is to maintain service SLA with optimal overheads and minimum manual intervention, as it may greatly help in bringing down the operational expense (OPEN).

As will be appreciated, maintenance of SLA may require fault recovery, scaling up/down of network resources, re-allocating resources allocated to a service, ensuring availability of required amount of redundant resources, and so forth. Typically, these actions are the responsibility of service orchestration. Existing techniques may typically provide for static (rule-based) approach for SLA maintenance as part of service orchestration. However, in case of programmable networks involving software defined networking (SDN) and network function virtualization (NFV), static approaches may not be effective under dynamic conditions (user, network, traffic type). In particular, static approaches may be inadequate in solving the problem of SLA maintenance. For example, a rule to allocate an additional virtual machine (VM) to a network function may not work if sufficient resources are not available in the specific location, thereby leading to increased latency affecting key performance indicators (KPIs) of services, etc. Further, static approaches may cause side effects (including performance degradation) to other services and other subnets. For example, fixing a radio access network (RAN) congestion by increasing resources may lead to core network congestion. Moreover, static approaches may result in sub-optimal network resource usage.

Existing techniques for SLA maintenance in dynamic conditions (user, network, traffic type) may include employing a dynamic cognitive-based mechanism of service orchestration. For example, some of the existing techniques may provide for a machine-learning (ML) or artificial-intelligence (AI) based mechanism to maintain SLA. Further, for example, some of the existing techniques may provide for a knowledge plane below an orchestration plane. The knowledge plane may provide necessary insights to the orchestration plane for better decision making in the communication network segment. Moreover, for example, some of the existing techniques may provide for autonomic decision elements (ADEs) or autonomic management systems (AMSs) that are placed in different layers of the communication network (e.g., node-component level, node-level, and network-level) as per static placement policies, their respective capabilities, SLA parameters, and quality of service (QoS) parameters.

However, these techniques fail to disclose maintenance of end-to-end (e2e) SLA, or e2e orchestration of cognitive functions (CFs). For example, these techniques take actions for SLA maintenance only for a particular service without assessing impact of actions on other services, or network resource optimization. Additionally, these techniques may be ineffective in maintaining SLA for lack of dynamic detection, analysis, and appropriate resolution of a fault. For example, under dynamic user and network conditions, the AMS or ADE placement may turn out to be inappropriate. In particular, for a user with high mobility, an AMS at the network edge may be inappropriate for timely actions. Similarly, for a low latency use case, a network-level ADE alone may be inappropriate for timely actions. Further, it may be inappropriate for an AMS to be in a network segment that is highly overloaded. Similarly, an ADE in a network segment that is under high network congestion may not be able to resolve faults in a timely manner. Moreover, for example, interaction between network-level ADEs may be limited or non-existent, which may result in conflicts (e.g., low latency requirements may conflict with redundancy requirements if both act in isolation), ineffective, or non-optimal actions from the perspective of e2e SLA maintenance.

Thus, existing techniques for cognitive-based fault or performance analysis and resolution are plagued by one or more of following limitations: a) localized detection and resolution of fault or performance issues when the service level fault or performance issues are likely to span across multiple network segments, b) service-specific detection and resolution of fault or performance issues that may not address fault or performance issues that affect more than one service, c) inappropriate place for detection and resolution of fault or performance issues—static approach for fault analysis and resolution determination performed away from the affected node or segment may likely introduce delay in implementing the resolution to the relevant node or segment, the network node statically identified for fault analysis and resolution determination may not have sufficient spare capacity (at that instant) to carry-out the fault analysis and resolution determination functions that may result in either delay or refusal in fault analysis and resolution determination (thus, negatively impacting service SLA maintenance), and d) failure in assessing effectiveness of implemented fault/performance issue resolution and taking necessary corrective actions in case of ineffective resolution.

In other words, existing techniques fail to provide end-to-end, service agnostic and orchestrated fault handling using cognitive means for effective service SLA maintenance under adverse network conditions.

SUMMARY

In one embodiment, a method for performing orchestration of cognitive functions (CFs) in a distributed heterogeneous communication network is disclosed. In one example, the method may include determining a fault or a performance issue and one or more associated causes, related to a set of network slices in the distributed heterogeneous communication network or a set of services across the set of network slices, using one or more CFs associated with each of the set of services or with each of the set of network slices. The method may further include determining one or more possible resolutions for the fault or the performance issue based on the one or more associated causes. The method may further include identifying a resolution by evaluating each of the one or more possible resolutions for at least one of a suitability to or an impact on the set of services or the set of network slices. The method may further include implementing the resolution on one or more affected network segments of the set of network slices.

In one embodiment, a system for performing orchestration of CFs in a distributed heterogeneous communication network is disclosed. In one example, the system may include an orchestration device, which in turn may include at least one processor configured to execute a set of instructions for providing a fault and performance prediction module (FPPM), a fault and performance issue resolution module (FPIRM), and at least one of a slice orchestration module (SLOM), a service lifecycle handling module (SLHM), or a resource orchestration module (RORM). The FPPM may determine a fault or a performance issue and one or more associated causes, related to a set of network slices in the distributed heterogeneous communication network or a set of services across the set of network slices, using one or more CFs associated with each of the set of services or with each of the set of network slices. The FPIRM may determine one or more possible resolutions for the fault or the performance issue based on the one or more associated causes, and may identify a resolution by evaluating each of the one or more possible resolutions for at least one of a suitability to or an impact on the set of services or the set of network slices. The at least one of the SLOM or the RORM may implement the resolution on one or more affected network segments of the set of network slices. The orchestration device may further include at least one computer-readable medium that stores the set of instructions, configuration data, fault or performance data, event data, network data, and threshold data.

In one embodiment, a non-transitory computer-readable medium storing computer-executable instructions for performing orchestration of CFs in a distributed heterogeneous communication network is disclosed. In one example, the stored instructions, when executed by a processor, may cause the processor to perform operations comprising determining a fault or a performance issue and one or more associated causes, related to a set of network slices in the distributed heterogeneous communication network or a set of services across the set of network slices, using one or more CFs associated with each of the set of services or with each of the set of network slices. The operations may further include determining one or more possible resolutions for the fault or the performance issue based on the one or more associated causes. The operations may further include identifying a resolution by evaluating each of the one or more possible resolutions for at least one of a suitability to or an impact on the set of services or the set of network slices. The operations may further include implementing the resolution on one or more affected network segments of the set of network slices.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
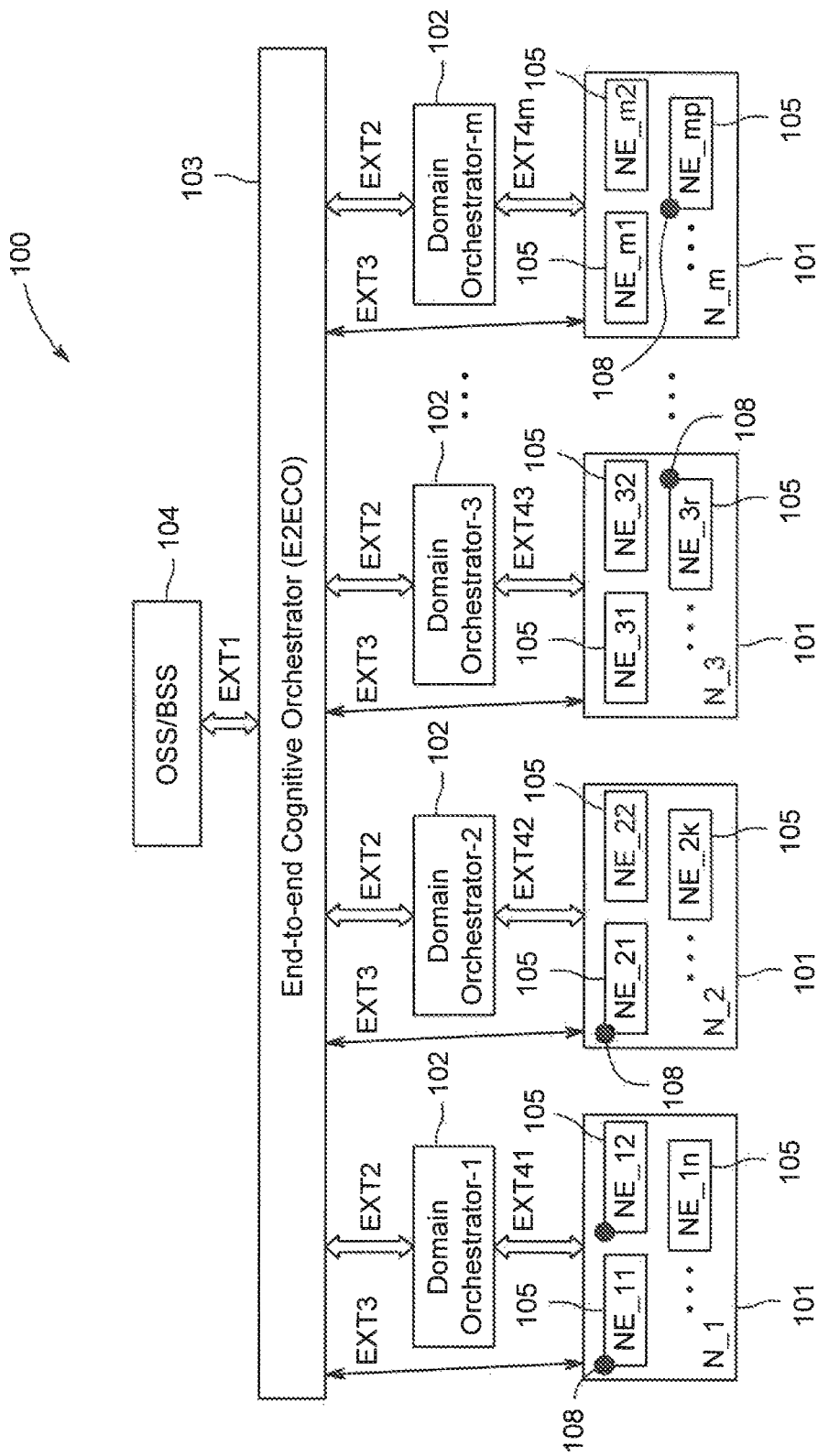
FIG. 1A illustrates an exemplary distributed heterogeneous communication network in which various embodiments of the present disclosure may function.

Referring now to FIG. 1A, an exemplary distributed heterogeneous communication network 100 in which various embodiments of the present disclosure may function, is illustrated. The distributed heterogeneous communication network 100 (also referred to as communication network 100 for the sake of brevity) may be employed by an operator or a service provider so as to deliver services to end-customers. The communication network 100 may include several network segments 101 (also referred to as network subnets 101) and several domain orchestration devices 102 (also referred to as domain orchestrators 102). Additionally, the communication network 100 may include an end-to-end cognitive orchestration (E2ECO) device 103 (also referred to as end-to-end cognitive orchestrator (E2ECO) 103). As will be described in greater detail in conjunction with FIGS. 2-5, the E2ECO device 103 may perform orchestration of cognitive functions (CFs) 108 in the communication network 100, in accordance with some embodiments of the present disclosure. Further, the communication network 100 may include an operations support system (OSS) 104 or business support system (BSS) 104.

The network segments 101 may include, but may not be limited to, a wireless access network (e.g., 4G, 5G, etc.), a fiber/optical backhaul, a packet core network, an Internet protocol (IP) network, multiprotocol label switching (MPLS) network, and so forth. Each of the network segments 101 (say, N_s) may further include a number of network elements (i.e., NE_s1, NE_s2 . . . ) 105. For example, in the illustrated embodiment, network segment N_1 may include network elements NE_11, NE_12 . . . NE_1n, network segment N_2 may include network elements NE_21, NE_22 . . . NE_2k, network segment N_3 may include network elements NE_31, NE_32 . . . NE_3r, and network segment N_m may include network elements NE_m1, NE_m2 . . . NE_mp. As will be described in greater detail in conjunction with FIG. 1B or FIG. 1C, in presence of network slicing, each of the network elements 105 for a given network segment 101 may be a part of different network slices (also referred to as slice subnets or network slice subnets).

Typically, a domain orchestration device 102 may be a network-segment orchestrator (e.g., a core network orchestrator, a software defined networking (SDN) orchestrator, a radio access network (RAN) orchestrator, etc.) configured to perform orchestration of a network segment 101. Thus, in the illustrated embodiment, each of the domain orchestration devices 102 (i.e., domain orchestrator-1, domain orchestrator-2, domain orchestrator-3 . . . domain orchestrator-m) are shown to interact with each of the network segments 101 (i.e., N_1, N_2, N_3 . . . N_m). In the presence of network slicing, there may be one domain orchestration device 102 per slice subnet instead of one domain orchestration device 102 per network segment 101. In other words, there may be 'n' domain orchestration devices 102 for network segment 101, if there are 'n' slice subnets of a network segment 101.

The OSS/BSS 104 may be communicatively coupled to the E2ECO device 103 via an interface EXT1. The interface EXT1 may employ any standard protocol (e.g., http, REST, SNMP, etc.) or any other proprietary protocol. Additionally, the E2ECO device 103 may be communicatively coupled to the domain orchestration devices 102, via an interface EXT2. It should be noted that, in some embodiments, each of the domain orchestration devices 102 may employ a different protocol to interact with the E2ECO device 103. In such embodiments, the interface EXT2 may be represented as multiple different interfaces EXT21, EXT22 . . . EXT2m. The interface EXT2 interface (or each of the interfaces EXT21, EXT22 . . . EXT2m) may employ any standard protocol (e.g., http, REST, SNMP, netconf/yang, etc.) or any other proprietary protocol. Further, the E2ECO 103 may be communicatively coupled to the network elements 105 in the network segments 101, via an interface EXT3 primarily for reporting of fault/performance data from the network elements 105. Again, it should be noted that, in some embodiments, each of the network segments 101 (in fact, each of the network elements 105) may employ a different protocol to interact with the E2ECO device 103. In such embodiments, the interface EXT3 interface may be represented as multiple different interfaces EXT31, EXT32 EXT3m. The interface EXT3 (or each of the interfaces EXT31, EXT32 . . . EXT3m) may employ any standard protocol (e.g., REST/RESTCONF, netconf/yang, etc.) or any other proprietary protocol. Moreover, each of the domain orchestration devices 102 may be communicatively coupled to the network elements 105 in the network segments 101, via interfaces EXT41 to EXT4m respectively, so as to configure the network elements 105, to obtain notifications upon occurrence of fault, alarm, event, etc., and to report any performance data. Each of the interfaces EXT41, EXT42 . . . EXT4m may employ any standard protocol (e.g., SNMP, netconf/yang, openflow, REST etc.) or any other proprietary protocol.

Figure 1B:
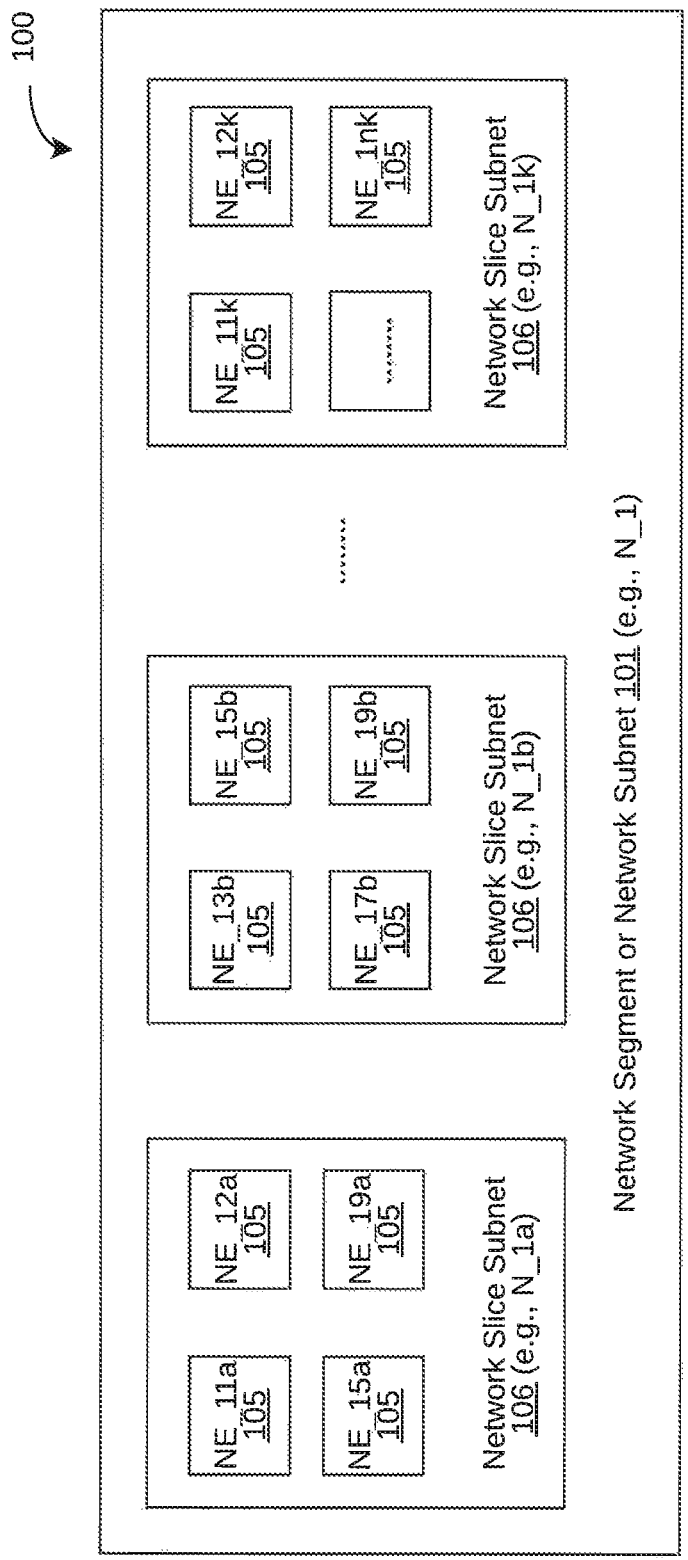
FIG. 1B illustrates constituents of an exemplary network segment in presence of network slicing.

Referring now to FIG. 1B, constituents of an exemplary network segment in presence of network slicing is illustrated. As will be appreciated, network slicing may enable operators to provide portions of their networks for specific customer uses cases (e.g., smart home. Internet of Things (IoT), connected car, smart energy grid, etc.). Each use case may receive a unique set of optimized resources and network topology (covering certain SLA-specified factors such as connectivity, speed, and capacity) that suit the needs of that application. In other words, network slicing may enable allocation of a set of network resource (i.e., slice) for a class of user, enterprise, or set of services having similar characteristics.

As illustrated, each of the network segments 101 may include a number of network elements 105, which may be part of one or more network slices or network slice subnets 106. Thus, network elements 105 (say, NE_s1a, NE_s2a . . . ) may be part of a network slice subnet 106 (say, N_Sa) of a network segment 101 (say, N_s). For example, in the illustrated embodiment, network segment N_1 may include network elements NE_11a, NE_12a, NE_15a, NE_19a in network slice subnet N_1a, network elements NE_13b, NE_15b NE_17b, NE_19b in network slice subnet N_1b, and network elements NE_11k, NE_12k . . . NE_1nk in network slice subnet N_1k. As will be appreciated, in the illustrated embodiment, NE_11a may refer to an instance of network element NE_11 that is part of the network slice subnet N_1a, while NE_11k may refer to another instance of the same network element NE_11 that is part of the network slice subnet N_1k. Similarly, NE_12a, NE_15a, and NE_19a may refer to instances of network elements NE_12, NE_15, and NE_19 respectively that is part of the network slice subnet N_1a, while NE_12k, NE_15b, and NE_19b may refer to other instances of the network elements NE_12, NE_15, and NE_19 respectively that is part of the network slice subnet N_1k, or the network slice subnet N_1b. It should be noted that, in the illustrated embodiment, an instance of a network element 105 is shown to be part of only one network slice subnet 106 for the sake of simplicity and clarity. However, in practice, an instance of a network element 105 may be part of more than one network slice subnet 106 as well. Further, it should be noted that, for the sake of simplicity and clarity, the interconnections among the network elements 105 in each of the network slice subnets 106 as well as interconnections among network slice subnets 106 (e.g., a RAN slice subnet connecting to a core slice subnet) are not shown.

Figure 1C:
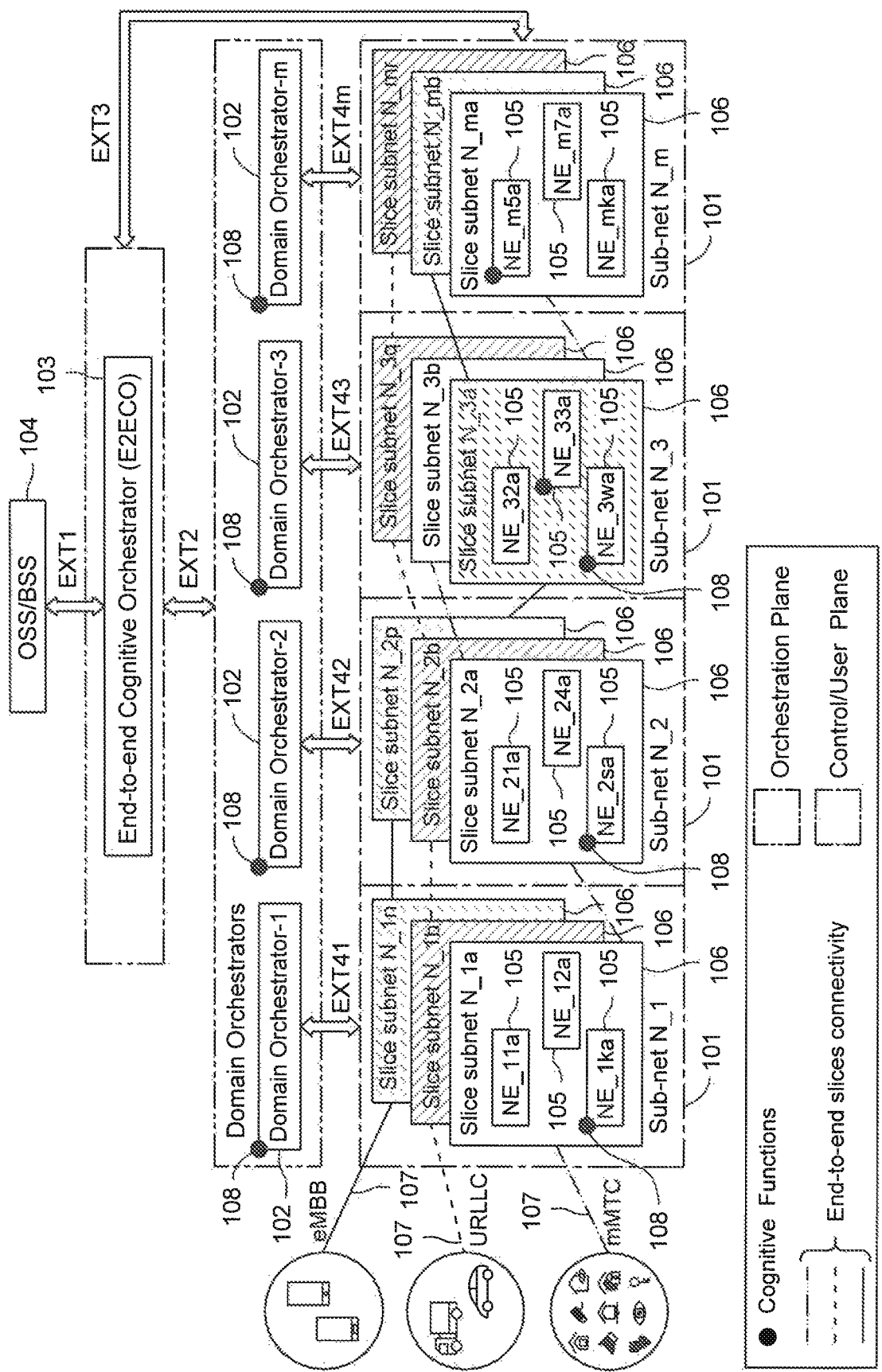
FIG. 1C illustrates an end-to-end view of the exemplary distributed heterogeneous communication network of FIG. 1A in the presence of network slicing.

Referring now to FIG. 1C, an end-to-end view of the exemplary distributed heterogeneous communication network 100 of FIG. 1A in the presence of network slicing is illustrated. In other words, FIG. 1C illustrates a superimposition of the concept of network slicing as described in reference to FIG. 1B in the communication network 100 of FIG. 1A. As stated above, each of the network segments 101 may be composed of one or more network slice subnets 106. For example, in the illustrated embodiment, network segment N_1 may be composed of 'n' network slice subnets N_1a, N_1b . . . N_1n, network segment N_2 may be composed of 'p' network slice subnets N_2a, N_2b . . . N_2p, network segment N_3 may be composed of 'p' network slice subnets N_3a, N_3b . . . N_3q, and network segment N_m may be composed of 'r' network slice subnets N_ma, N_mb . . . N_mr.

The communication network 100 may further include one or more end-to-end (E2E) network slices 107. Each of the E2E network slices 107 may be composed of one or more network slice subnets 106 across network segments 101 that may be 'stitched' together (i.e., communicatively interconnected to each other), The interconnections among network slice subnets 106 may be based on one or more standard protocols (e.g., transmission control protocol/Internet protocol (TCP/IP), general packet radio service tunneling protocol (GTP), etc.) and/or other proprietary protocols. For example, in the illustrated embodiments, E2E network slice 1 (say, for massive machine type communications (mMTC)) may be composed of network slice subnets $N\_1a$, $N\_2a$, $N\_3b$ ... $N\_ma$, E2E network slice 2 (say, for ultra-reliable low latency communications (URLLC)) may be composed of network slice subnets $N\_1b$, $N\_2b$, $N\_3q$ ... $N\_mr$, and E2E network slice 3 (say, for enhanced mobile broadband (eMBB)) may be composed of network slice subnets $N\_1n$, $N\_2p$, $N\_3a$ ... $N\_mb$.

One or more CFs 108 may be employed at some of the nodes (e.g., network elements 105, domain orchestration device 102, etc.) of the communication network 100. In particular, these nodes may host one or more machine learning, deep learning, or artificial intelligence functions as part of CFs 108 so as to predict various parameters (e.g., number of handover in a pre-defined period of time, increase in congestion, etc.). Further, as will be appreciated, the CFs 108 are shown separately for the sake of clarity. However, in actual implementation, the CFs 108 may be part of an existing node, or may be a plug-in on top of an existing node, or may be a completely new node, etc. Further, CFs 108 may be custom built for a particular network slice subnet, or may be common across network slice subnets (i.e., may be slice agnostic). It should be noted that the scope or coverage (for data collection and analysis) of the CFs 108 in the network subnets may be at node level or at part of the subnet level, while the scope or coverage of the CFs 108 in the domain orchestrator plane may be at a domain level or at an entire subnet level.

Typically, the E2ECO device present in a 4G or a 5G communication network performs E2E orchestration of services and network slices. As stated above, the E2ECO device 103 present in the communication network 100 may additionally perform orchestration of the CFs 108. In particular, the E2ECO device 103 may be enhanced, in accordance with some embodiments of the present disclosure, so as to perform orchestration of the CFs 108. As will be described in greater detail in conjunction with FIGS. 2-5, the E2ECO device 103 may interface with the domain orchestration devices 102 as well as with the network elements 105 in the various network segments 101 or network slice subnets 106 so as to perform effective orchestration of CFs 108.

Figure 2:
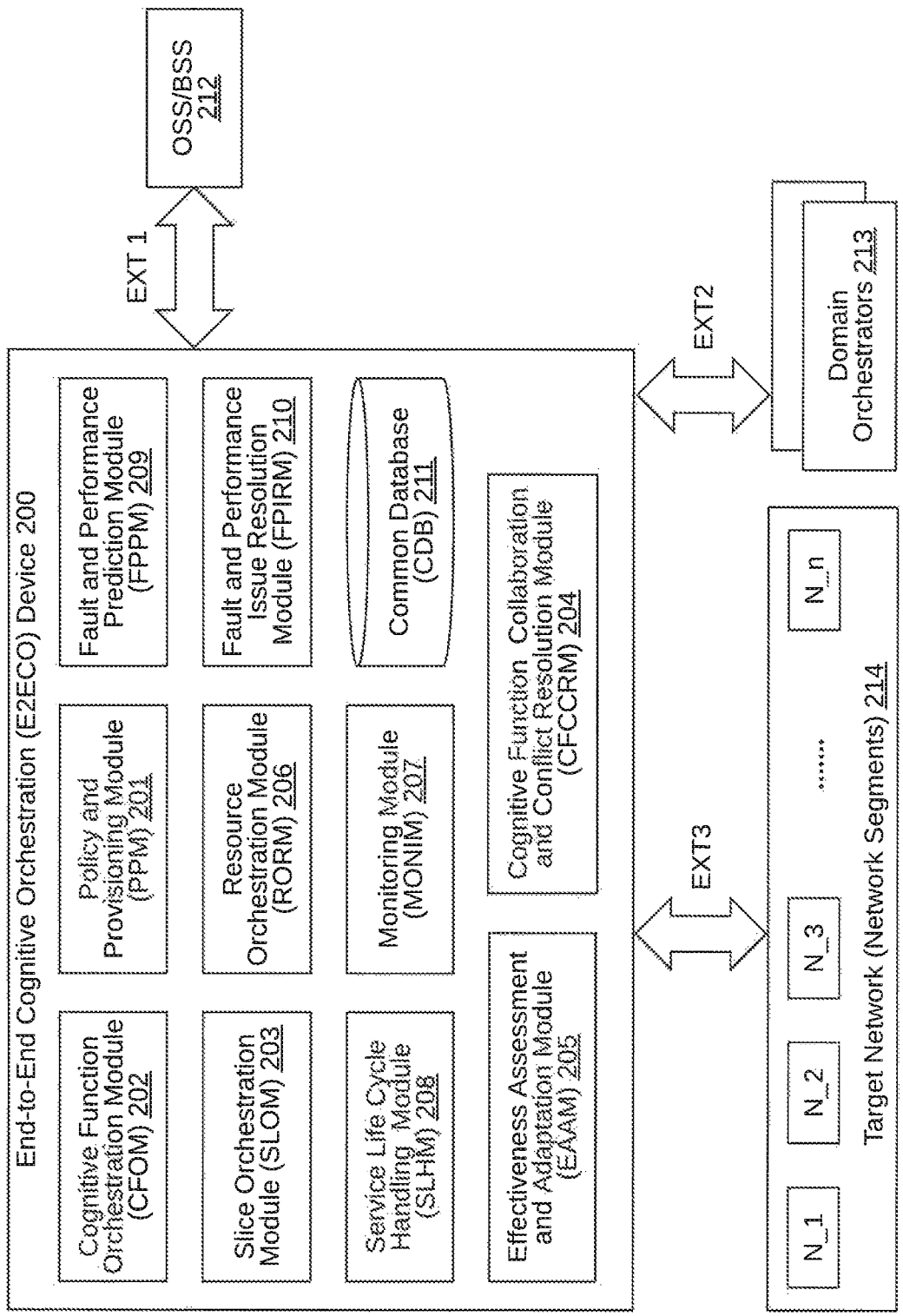
FIG. 2 is a functional block diagram of an exemplary E2E cognitive orchestration (E2ECO) device that may be implemented by the distributed heterogeneous communication network of FIG. 1A or FIG. 1C for performing orchestration of cognitive functions (CFs), in accordance with some embodiments of the present disclosure.

Referring now to FIG. 2, a functional block diagram of an exemplary E2ECO device 200, analogous to the E2ECO device 103 implemented by the distributed heterogeneous communication network 100 of FIG. 1, is illustrated in accordance with some embodiments of the present disclosure. As will be described in greater detail below, in addition to its existing responsibilities, the E2ECO device 200 may perform orchestration of CFs for service level maintenance. In particular, the E2ECO device 200 may determine a fault or a performance issue and associated causes related to a set of network slices in the communication network or a set of services across the set of network slices. It should be noted that the E2ECO device 200 may determine the fault or the performance issue and associated causes using CFs associated with each of the set of services or with each of the set of network slices. Additionally, the E2ECO device 200 may determine possible resolutions for the fault or the performance issue based on the one or more associated causes, may identify a resolution by evaluating each of the possible resolutions for at least one of a suitability to or an impact on the set of services or the set of network slices, and may implement the resolution on one or more affected network segments of the set of network slices.

The E2ECO device 200 may include one or more processors (not shown) for executing one or more instructions for operating various modules or hosting such modules that perform orchestration of services, network slices, and CFs and other functions. For example, in some embodiments, all of the aforementioned modules may be co-located on the same processor. However, typically, only some of the modules may be co-located on the same processor while remaining may be located on other processors. Further, some of the processors may have special characteristic features to effectively host the module. The E2ECO device 200 may further include one or more memory (not shown) for storing various instructions corresponding to various modules. The memory may also store multiple system and network parameters received by the E2ECO device 200 as well as other data as required by or as processed by various modules. It should be noted that the memory may include a volatile memory and a non-volatile memory. For example, various instructions corresponding to various modules (that may be loaded in the one or more processors for execution) may be stored in the non-volatile memory, while various parameters and data may be stored in the volatile memory and/or the non-volatile memory. As stated above, the E2ECO device 200 may also include a number of interfaces for interfacing with rest of the communication network so as to send and receive various data and commands.

In some embodiments, various modules in the E2ECO device 200 may include a policy and provisioning module (PPM) 201, a cognitive function orchestration module (CFOM) 202, a slice orchestration module (SLOM) 203, a cognitive function collaboration and conflict resolution module (CFCCRM) 204, an effectiveness assessment and adaptation module (EAAM) 205, a resource orchestration module (RORM) 206, a monitoring module (MONIM) 207, a service lifecycle handling module (SLHM) 208, a fault and performance prediction module (FPPM) 209, and a fault and performance issue resolution module (FPIRM) 210. Additionally, the E2ECO device 200 may implement a common database (CDB) 211 accessible by various modules 201-210. Further, the E2ECO device 200 may interface with OSS/BSS 212, domain orchestration devices 213, and one or more network elements in one or more network segments 214 using interfaces EXT1, EXT2, and EXT3 respectively.

The PPM 201 may be responsible for obtaining various provisioning inputs from the OSS/BSS 212 via the interface EXT1. The provisioning inputs may include, but may not be limited, to:

a) high-level intent (HLI), which may be for example, for operating the network at high reliability (say, five 9's) while adhering to service level agreement (SLA) or key performance indicator (KPI) values of the service or the slice;

b) target SLA/KPI parameters of services and slices (TARGET-SLA-KPI-LIST) it may be noted that generic SLAs/KPIs may be provisioned upfront, while service or slice specific SLAs/KPIs may be provisioned at the time of creating the service or slice;

c) policies and constraints (POCO);

d) thresholds (THRES-LIST), which may be for example, ANALYSIS-DELAY-THRES;

e) rules for mapping HLI to configuration parameters such as capacity limits, redundancy level and type (e.g., 1+1, 1+1 geo-redundancy), thresholds for triggering preventive actions (e.g., 70% for actual-latency-KPI against the target-latency-KPI), resource allocation rules, parameters to be monitored, etc. (HLI-MAPPING-RULES);
f) events and parameters to be monitored for different services (SERVICE EVENT-PARAMS), which may be for example,
mandatory parameters and events to monitor for a service (variable list based on the service characteristics);
optional parameters and events to monitor for a service along with conditions (active services, geo location, class of users, etc.);
some of this information may be provisioned at the time of service creation; and
when TARGET-SLA-KPI for a service is provisioned, SERVICE EVENTS-PARAMS-TABLE may be updated appropriately by the PPM 201 based on learning from historical data;
g) events and parameters to be monitored for different slices (SLICE-EVENT-PARAMS), which may be for example,
mandatory parameters and events to monitor or a slice (variable list based on the slice characteristics);
optional parameters and events to monitor for a slice along with conditions (active slices, geo location, class of users, etc.);
some of this information may be provisioned at the time of slice creation;
if the inputs to the PPM 201 are the events and parameters for slice types/categories (and not for each specific service), for example, 'URLLC slice', 'eMBB slice', etc., then the PPM 201 may determine the events and parameters to be monitored for a specific slice (based on historical data) at the time of slice activation; and
when TARGET-SLA-KPI for a slice is provisioned, SLICE-EVENTS-PARAMS-TABLE may be updated appropriately by the PPM 201 based on learning from historical data;
h) mapping of events/parameters to be monitored and analyzed to the corresponding cognitive analysis type required (e.g., latency KPI may require regression along with deep learning, congestion monitoring may require decision tree analysis, etc.) (ANALYSIS-CF-MAPPING-TABLE);
i) performance monitoring window (PERF-OBS-WINDOW) after a resolution action has been implemented;
j) cognitive inputs for a CF to perform effectively (CF-ANALYS-INPUTS-TABLE), which may be for example, if trend of latency in access network data is determined by a CF using machine learning techniques, it might be helpful to use this information by another CF for root cause analysis in the access network (instead of raw latency data)—conditions as to mandatory versus optional dependency may be derived from the intent or may be provisioned (and adapted based on learning);
k) nodes or network elements (NEs) capable of performing a particular CF (CF-CAPAB-TABLE)—this may be provisioned whenever a new node or node type is added to the network, when a node/NE is modified (functional capabilities as well as resources), when a node/NE is removed from the network, the PPM 201 may remove the corresponding entries from this table;
l) nodes/NEs capable of performing root cause analysis (CAUSE-ANALYS-CAPAB-CF-NODE-LIST);
m) values of various factors (e.g., RES-FACTOR, MOB-FACTOR) and the corresponding scale/conditions (e.g., if a factor takes a value range 1-5, when shall value 1 be mapped, value 2 be mapped, etc.);
n) duration of time to consider for conflict analysis by the CFCCRM 204 (ACTION-TIME-WINDOW);
o) actions having opposite effect (e.g., scale up and scale down) (OPP-ACTS-TABLE)—it may be noted that one action may have multiple actions having opposite effect (e.g., shortening service path may have opposite effect as decreasing throughput, lengthening service path, etc.);
p) actions to resolve conflicts (CONFLICT-RES-ACTIONS);
q) thresholds for maximum and minimum improvements in SLA/KPI adherence (UPPER-IMPR-THRESHOLD and LOWER-IMPR-THRESHOLD respectively), this may be used by the EAAM 205 to assess effectiveness and make adjustments;
r) suitability of a resolution action (SUIT-SCORE); and so forth.

Additionally, the PPM 201 may be responsible for translating HLI into a set of configuration parameters using ADAPT-HLI-MAPPING-RULES, and initiating configuration of the impacted components in the E2ECO device 200 as well as other network elements. Further, the PPM 201 may be responsible for determining the parameters to be monitored (MO-PAR) so as to determine the performance levels of the nodes, services and slices, and to determine conformance to the HLI. Further, upon receiving a service instantiation request from the OSS/BSS 212 (in some cases, preceded or accompanied by a slice instantiation request), the PPM 201 may trigger the SLHM 208 and SLOM 203 to take necessary actions to activate the service. In such cases, the PPM 201 may also trigger the CFOM 202 for lifecycle management of the CFs including appropriate activation.

The PPM 201 may fill in the following data-structures based on the provisioned inputs and may store them within memory (persistent in CDB 211 as well as in volatile memory) when a service is being activated:
SERVICE-NTW-SEG-MAPPING-TABLE, which may contain the geographical location/network segment(s) where the service is being provided—the PPM 201 may fill in this table based on static/provisioned mapping, or inputs from the operator (the operator may provide the network segment(s) where the service is activated at the time of service instantiation); and
SERVICE-PRIORITY-TABLE, which may be provisioned initially and/or updated every time a service is created/instantiated.

Additionally, the PPM 201 may fill in the following data-structures based on the provisioned inputs and may store them within memory (persistent in CDB 211 as well as in volatile memory) when a slice is being activated:
SLICE-NTW-SEG-MAPPING-TABLE, which may contain the geographical location/network segment(s) where the slice is being activated—this may be provisioned by the operator, or it may be derived by the SLOM 203 when instantiating a slice to accommodate a new service; and
SLICE-PRIORITY-TABLE, which may be provisioned initially and/or updated every time a slice is created/instantiated.

In accordance with aspects of the present disclosure, the CFOM 202 may perform at least the following functions:

a) determine the CFs to be activated for a service using SERVICE-EVENTS-PARAMS and ANALYSIS-CF-MAPPING-TABLE;
b) determine the CFs to be activated for a slice using SLICE-EVENTS-PARAMS and ANALYSIS-CF-MAPPING-TABLE;
c) determine the sequence of CFs for a service that is being instantiated/modified, and update CF-SEQUENCE-SERVICES-TABLE;
d) determine the sequence of CFs for a slice that is being instantiated/modified, and update CF-SEQUENCE-SLICES-TABLE;
e) determine the appropriate network nodes where the required CFs may be activated;
f) determine the appropriate nodes where the causal analysis should be performed for a service/slice (CAUSE-ANALY-CF-NODE);
g) determine the inter-dependencies and collaboration among one or more CFs (it may then form a graph such as one illustrated in FIG. 3); or
h) instantiate/activate CFs, and set-up the CF sequence.

Figure 3:
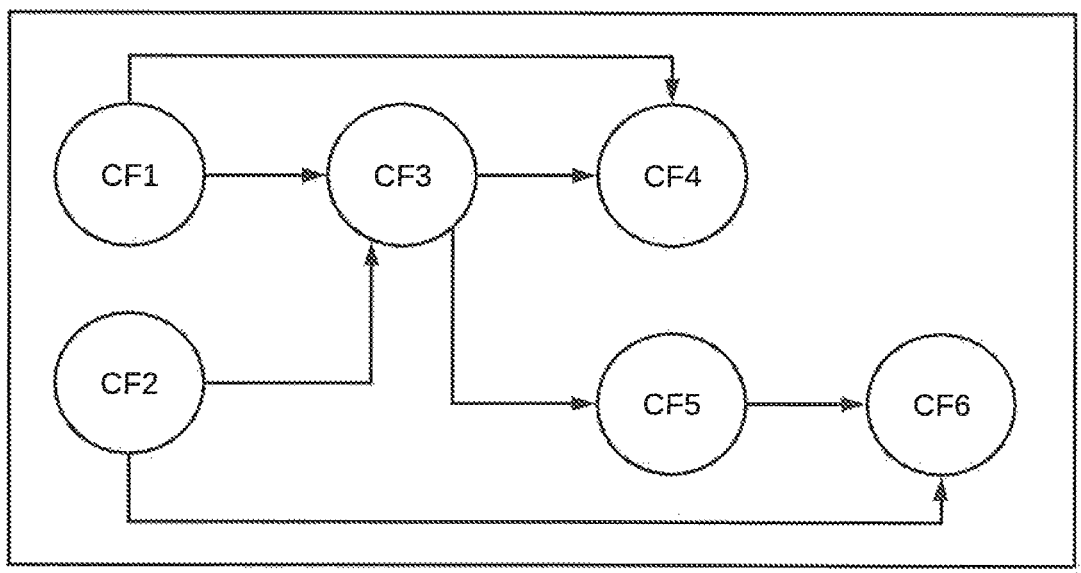
FIG. 3 illustrates an exemplary inter-dependencies and collaborations among the CFs.

Referring now to FIG. 3, an exemplary inter-dependencies and collaborations among the CFs is illustrated. The dependencies and interconnections among the CFs may be an important factor while performing their analysis. It should be noted that FIG. 3 shows only dependencies and interconnections among the CFs. It does not depict the data inputs coming from the NEs in the communication network.

Referring back to FIG. 2, the SLOM 203 may perform orchestration of the slices including slice creation, slice instantiation, slice scaling, slice healing, and slice termination. The SLOM 203 may also map services to appropriate slices if the operator does not specify the slice on which a service should be instantiated during service instantiation. In such cases, the slice to which the service should be mapped may have to be instantiated/modified as appropriate to be able to host the service. The SLOM 203 may closely interact with the SLHM 208 so as to obtain relevant inputs to scale up/down/modify the slice resources, for example, during service instantiation, service termination, service modification and service termination. The actual scale up/down/modify actions on the slice resources may be performed by the RORM 206.

The SLOM 203 may also update the following data structures stored within the memory (persistent in CDB 211 as well as in volatile memory):
SERVICE-SLICE-MAPPING-TABLE, which may contain details of the services being mapped to different slices, when a service is instantiated, deactivated, or modified—this table may be filled in based on provisioned inputs (at the time of service instantiation), static mapping rules, or this table may be filled by the SLOM 203 if it dynamically determines which slice to map a service to;
ACT-SLICES, which may contain details of slices that are currently active; and
SLICE-NTW-SEG-MAPPING-TABLE, which may contain the geographical location/network segment(s) where this slice is being activated—this may be based on static/provisioned mapping, or operator may provide the network segment(s) information at the time of slice instantiation, or it may be derived by the SLOM 203 when instantiating a slice to accommodate a new service.

The CFCCRM 204 may resolve conflicts that may arise during the determination of resolution actions to address a fault/performance issue in a service or slice. This is described in greater detail in conjunction with FIGS. 5A and 5B. It should be noted that potential conflicts may arise when a proposed resolution action is directly opposite to what was done earlier within a short time interval for the same service/slice, when a resolution action directly impacts another service/slice KPIs, etc. The EAAM 205 may adapt the rules for mapping of high-level intent (HLI) into a set of configuration parameters (HLI-MAPPING-RULES) to form ADAPT-HLI-MAPPING-RULES, The EAAM 205 may also adapt parameter values and thresholds, events and parameters to be monitored, etc., including, but not limited to, ADAPTED-RES-RULES, SUIT-SCORE, SERVICE-EVENTS-PARAMS-TABLE, SLICE-EVENTS-PARAMS-TABLE, and CONFLICT-RES-ACTIONS. Again, this is described in greater detail in conjunction with FIGS. 5A and 5B.

The RORM 206 may be responsible for allocating and orchestrating resources (physical and virtual) across various segments and slices in the network to be able to host services provisioned by the operator. Additionally, the RORM 206 may be responsible for allocating resources based on instructions from the SLHM 208, the SLOM 203, and the CFOM 202, for example, choosing the right cloud instances for allocating resource for a particular service, if the service requires high reliability and low latency. Further, the RORM 206 may be responsible for ensuring that the usage of resources is optimal by constantly monitoring the active services and slices, traffic patterns, etc.

The MONIM 207 may be responsible for collecting the fault, performance, and event data from various NEs, as well as actual SLA/KPI trends, resource occupancy trends, etc. Additionally, the MONIM 07 may store the collected information in the CDB 211. As will be described in greater detail in conjunction with FIGS. 5A and 5B, the MONIM 207 may perform pre-processing of the data using pre-provisioned rules, and then may passes the information to the FPPM 209. The MONIM 207 may also responsible for housekeeping of the monitored data in CDB 211, for example, only the raw data of last 48 hours and aggregated data of the previous 15 days may be stored in CDB 211. Older data may be cleaned up after sending appropriate information to the OSS/BSS 212, or may be stored in a central database.

The SLHM 208 may be responsible for all actions associated with the lifecycle of a service, including service creation, instantiation, scaling, healing, modification and termination. The SLHM 208 may interact with RORM 206 so as to obtain the resources necessary for the service. When activating, deactivating, or modifying a service, the SLHM 208 may also update ACT-SERVICES stored in the memory (persistent in CDB 211 as well as in volatile memory to ensure high-availability). The ACT-SERVICES may contain details of services that are currently active.

The FPPM 209 may perform at least following functions:
a) predict/detect fault or performance issue in one or more service(s)/slice(s) using pre-provisioned inputs (FPP-RULES) that may be adapted by the EAAM 205 (ADAPT-FPP-RULES);
b) trigger the CAUSE-ANALY-CF-NODE associated with the service/slice for causal analysis;
c) upon obtaining inputs from the CAUSE-ANALY-CF-NODE(s) with the root cause(s), determine if the root cause(s) affects other service(s)/slice(s);
d) trigger the FPIRM 210 for determining appropriate actions to address the predicted fault/performance issue(s); or
e) trigger the FPIRM 210 for determining appropriate actions for all service(s)/slice(s) (one by one) that are impacted by implementing a resolution action in a service/slice (to address a fault/performance issue).

The FPIRM 210 may perform at least following functions:
a) determine possible resolutions for the determined root cause using ADAPTED-RES-RULES and inputs from the CAUSE-ANALY-CF-NODE;
b) determine most appropriate resolution for a particular issue;
c) determine if determined resolution addresses all services/slices impacted by the issue, checks for possible alternatives and chooses the most appropriate resolution considering the impacts in other services/slices;
d) determine appropriate preventive/corrective actions for impacts arising out of implementing a resolution to address an issue in a service/slice; or
e) interact with CFCCRM 204 to resolve conflicts.

As stated above, the CDB 211 may be used for persisting all relevant information—configuration data, performance metrics, thresholds, adapted rules, trends, etc. As will be appreciated, housekeeping of relevant information may be done by different modules within the CDB 211. For example, maintenance of performance metrics, ACTUAL-SLA-KPI data, etc. may be the responsibility of MONIM 207, ADAPT-HLI-MAPPING-RULES, ADAPT-FPP-RULES, etc. may be the responsibility of the EAAM 205, and so on.

It should be noted that the E2ECO device 200 may be implemented in programmable hardware devices such as programmable gate arrays, programmable array logic, programmable logic devices, and so forth. Alternatively, as stated above, the E2ECO device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, include the module and achieve the stated purpose of the module. Indeed, a module of executable code may be a single instruction, or many instructions, and may even be distributed over several different code segments, among different applications, and across several memory devices.

In other words, the E2ECO device 200 may be realized as multiple components (e.g., slice orchestrator(s), service orchestrator(s), and CFs orchestrator) in different deployment scenarios or configurations. However, the functional blocks and the processes described herein may be applicable even under such conditions.

As will be appreciated by one skilled in the art, a variety of processes may be employed for performing orchestration of CFs in the communication network 100. For example, the E2ECO device 200 may facilitate orchestration of CFs for SLA maintenance by the processes discussed herein. In particular, as will be appreciated by those of ordinary skill in the art, control logic and/or automated routines for performing the techniques and steps described herein may be implemented by components of the communication network 100 (e.g., the E2ECO device 200 and the CFs), either by hardware, software, or combinations of hardware and software. For example, suitable code may be accessed and executed by the one or more processors on the E2ECO device 200 to perform some or all of the techniques described herein. Similarly, application specific integrated circuits (ASICs) configured to perform some or all of the processes described herein may be included in the one or more processors on the E2ECO device 200.

Figure 4:
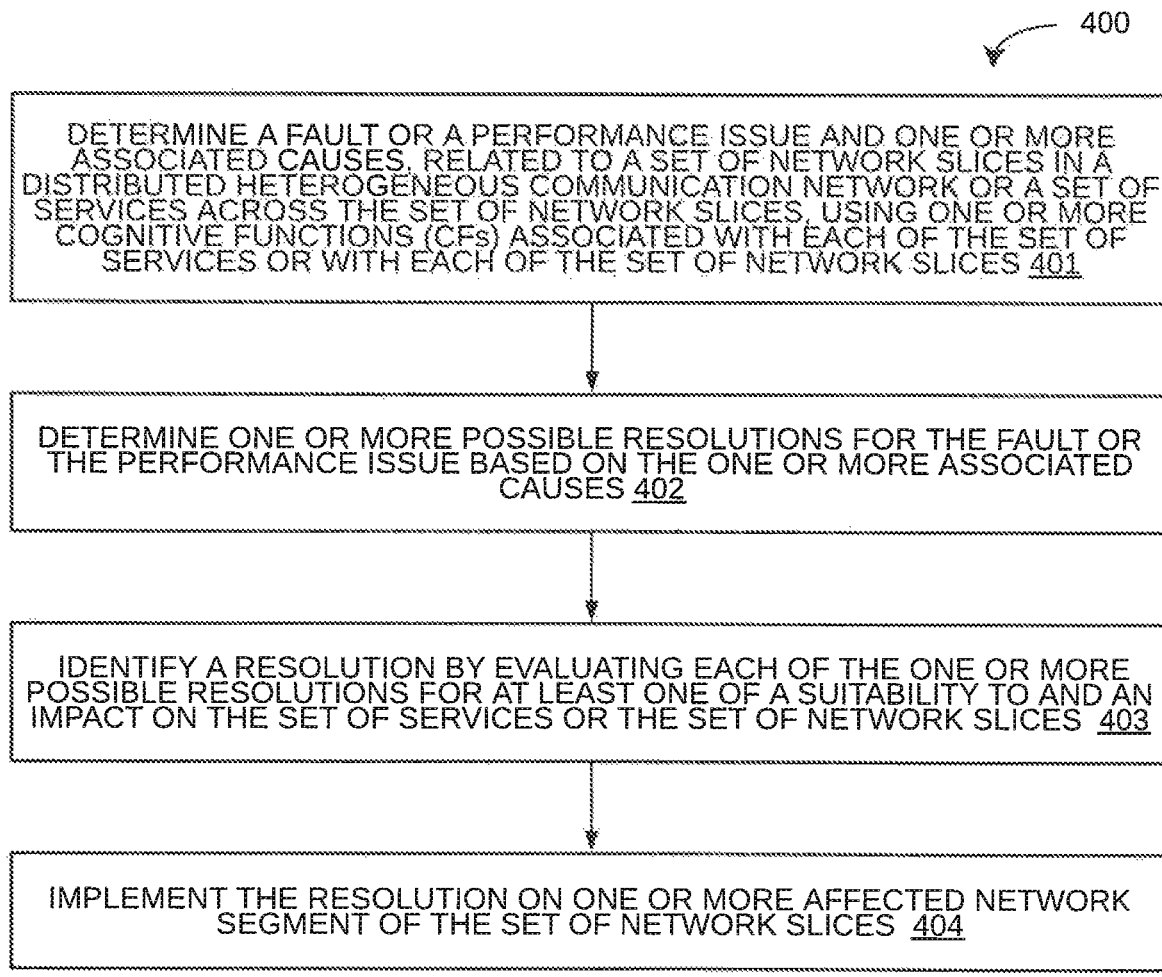
FIG. 4 is a flow diagram of an exemplary process for performing orchestration of CFs in the distributed heterogeneous communication network, in accordance with some embodiments of the present disclosure.

For example, referring now to FIG. 4, exemplary control logic 400 for performing effective orchestration of CFs in a communication network 100 via a network device, such as the E2ECO device 200, is depicted via a flowchart in accordance with some embodiments of the present disclosure. As illustrated in the flowchart, the control logic 400 may include the step of determining a fault or a performance issue and one or more associated causes, related to a set of network slices in the communication network 100 or a set of services across the set of network slices, using one or more CFs associated with each of the set of services or with each of the set of network slices at step 401. The control logic 400 may further include the steps of determining one or more possible resolutions for the fault or the performance issue based on the one or more associated causes at step 402, identifying a resolution by evaluating each of the one or more possible resolutions for at least one of a suitability to or an impact on the set of services or the set of network slices at step 403, and implementing the resolution on one or more affected network segments of the set of network slices at step 404.

In some embodiments, the control logic 400 may further include the step of determining the one or more CFs associated with each of the set of services or with each of the set of network slices by determining a set of key performance indicators (KPI's) associated with a service or a network slice upon activating the service or the network slice, determining a set of parameters to be monitored to compute the set of KPI's, and determining the one or more CFs based on the set of parameters to be monitored.

Additionally, in some embodiments, the control logic 400 may further include the step of activating and monitoring each of the one or more CFs by determining a set of optimal network nodes from among a set of capable network nodes for activating a CF based on at least one of a priority of a service, a priority of a slice, inter-dependencies among the one or more CFs, collaboration among the one or more CFs, a possible fault, or a possible performance issue, and by activating and monitoring the CF in the set of determined optimal nodes.

Further, in some embodiments, the control logic 400 may include the steps of assessing an effectiveness of the implementation by comparing a set of actual KPI's with a set of corresponding target KPI's for the set of services or the set of network slices, and performing tuning of at least one of: a set of pre-defined rules for identifying the resolution, a plurality of assessment parameters for identifying the resolution, and a set of pre-defined rules for determining optimal network nodes.

In some embodiments, determining the fault or the performance issue and the one or more associated causes at step 401 may include the steps of aggregating a set of events or a set of performance trends over a pre-defined period of time, and determining the fault or the performance issue and the one or more associated causes by evaluating the set of events or the set of performance trends. It should be noted that, in some embodiments, the events may include fault events, warnings, system events, and so forth. Further, it should be noted that, the determination of fault or performance issue may be reactive (i.e., after the fault or the performance issue has occurred) or proactive (i.e., predictive). Additionally, in some embodiments, determining the one or more possible resolutions at step 402 may include the step of determining the one or more possible resolutions based on a set of predefined rules, a set of policy constraints, a dynamic network condition, an availability of each of one or more required resources, a set of associated KPI's.

In some embodiments, identifying the resolution at step 403 may include the step of determining a suitability score of a possible resolution. It should be noted that the suitability score may be indicative of the suitability of the possible resolution. Additionally, in some embodiments, identifying the resolution at step 403 may include the step of assessing, for each of the set of services or each of the set of network slices, the impact of a possible resolution on a service or a network slice based on a set of target KPI's for the service or the network slice upon implementing the resolution. Further, in some embodiments, identifying the resolution at step 403 may include the step of evaluating each of the one or more possible resolutions for at least one of an impact on or a conflict with a set of other services or a set of other network slices based on at least one of a network condition, a set of associated KPI's, an associated performance level for each of the set of other services or the set of other network slices. In such embodiments, identifying the resolution at step 403 may include the step of identifying a possible resolution with a high suitability and at least one of a low impact on or a low conflict with the set of services, the set of other services, the set of network slices, or the set of other network slices.

Figure 5A:
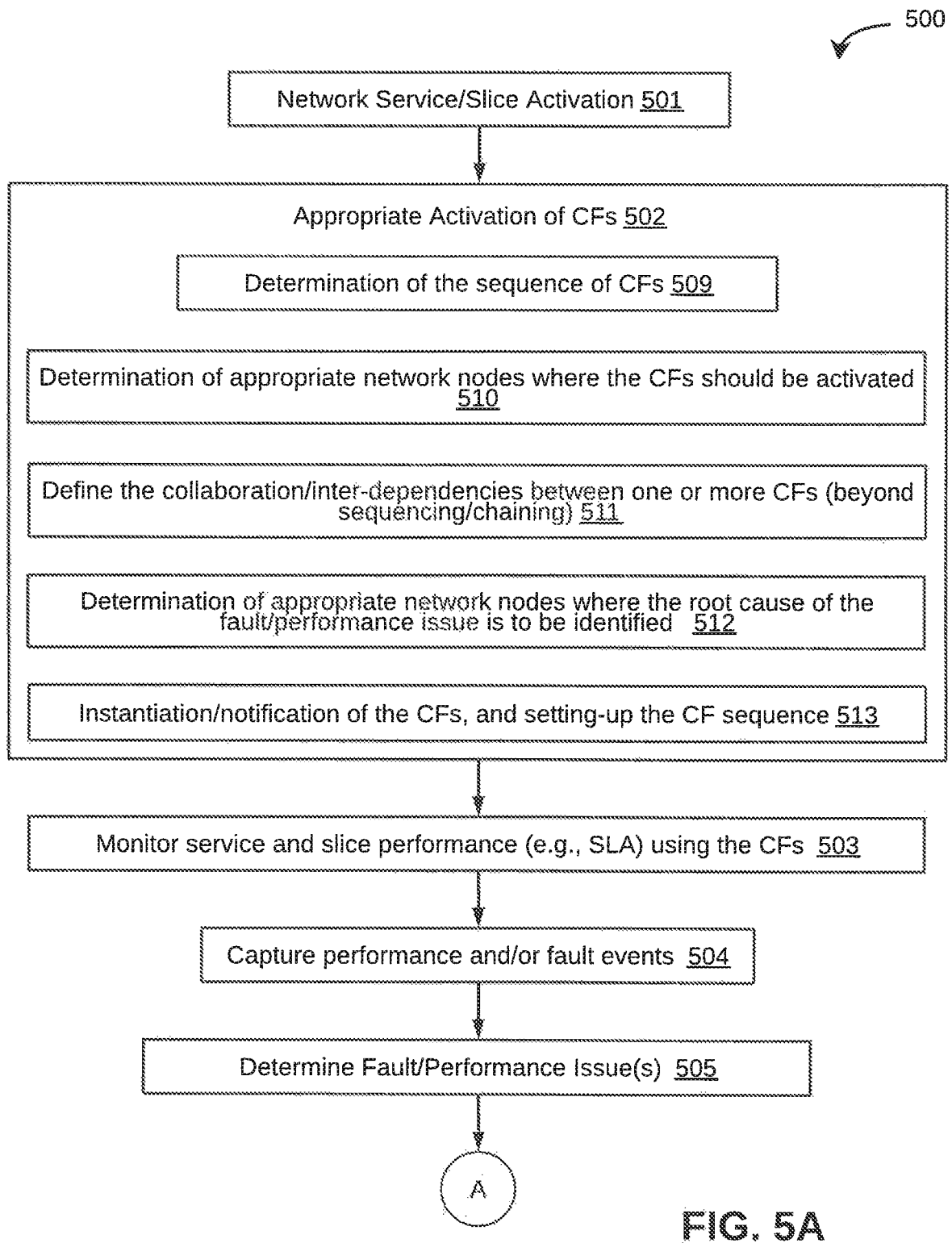
FIGS. 5A and 5B collectively is a flow diagram of a detailed exemplary process for performing orchestration of CFs in the distributed heterogeneous communication network, in accordance with some embodiments of the present disclosure.
Figure 5B:
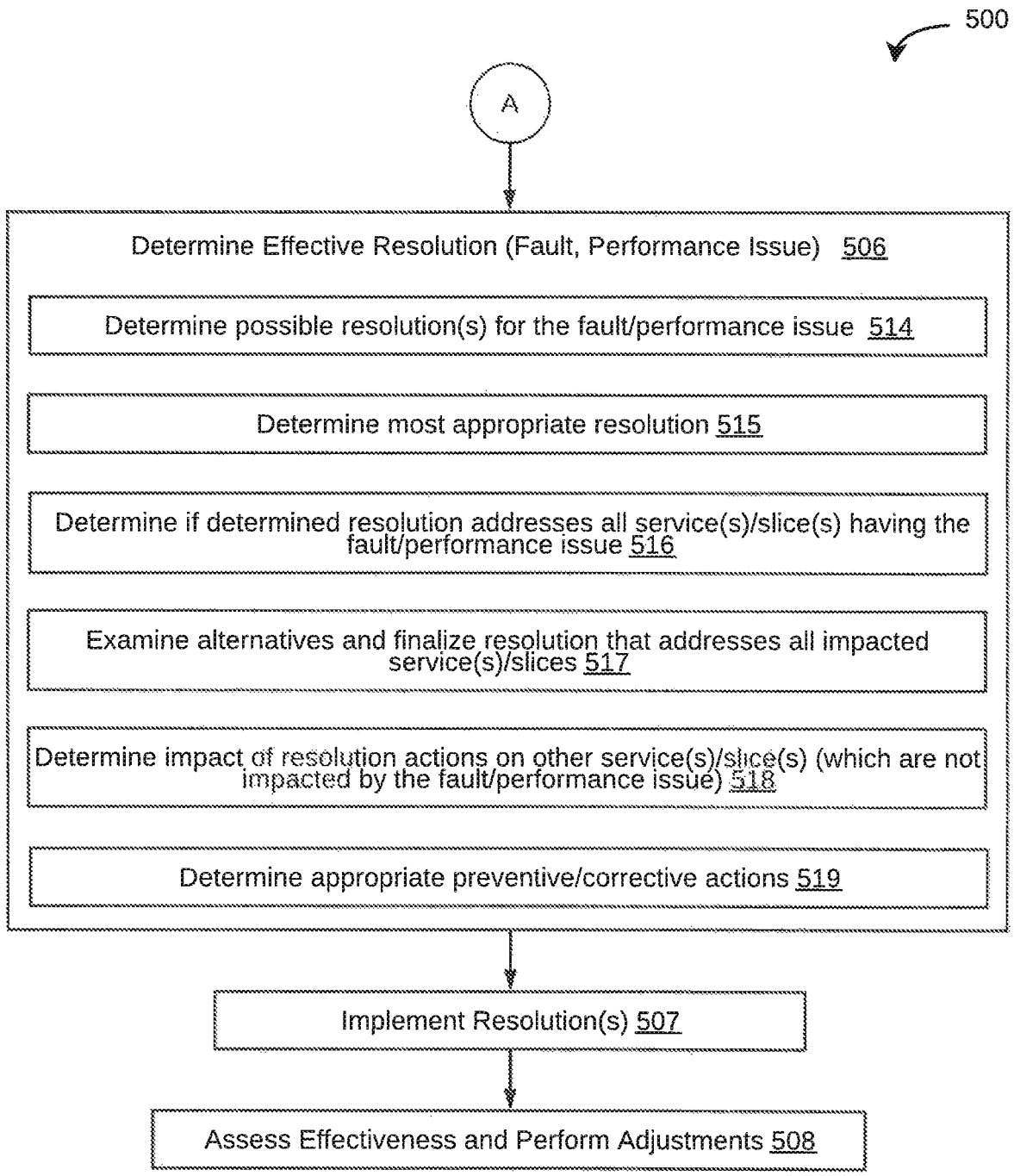

Referring now to FIGS. 5A and 5B, exemplary control logic 500 for performing effective orchestration of CFs in a communication network 100 is depicted in greater detail, via a flowchart, in accordance with some embodiments of the present disclosure. As illustrated in the flowchart, the control logic 500 may include the steps of activating a service or a slice, or both in the communication network at step 501, appropriately activating the CFs at step 502, monitoring service and slice performance (i.e., SLA) using the CFs at step 503, capturing performance and/or fault events at step 504, determining fault and/or performance issue(s) at step 505, determining effective resolution at step 506, implementing resolution(s) at step 507, and assessing effectiveness and performing adjustments at step 508. Each of these steps will be described in greater detail herein below.

In some embodiments, at step 501, the PPM 201 in the E2ECO device 200 may obtain inputs via the interface EXT1 from the OSS/BSS 212. The inputs may include, but may not be limited to, high-level intent (HLI), target SLA/KPI parameters of services and slices (TARGET-SLA-KPI-LIST), policies and constraints (POCO), thresholds (THRES-LIST), rules for mapping HLI to configuration parameters (HLI-MAPPING-RULES), events and parameters to be monitored for different services (SERVICE-EVENT-PARAMS), events and parameters to be monitored for different slices (SLICE-EVENT-PARAMS), mapping of events/parameters to be monitored and analyzed to the corresponding cognitive analysis type required (ANALYSIS-CF-MAPPING-TABLE), performance monitoring window (PERF-OBS-WINDOW), cognitive inputs for a CF to perform effectively (CF-ANALYS-INPUTS-TABLE), nodes/NEs capable of performing a particular CF (CF-CAPAB-TABLE), nodes/NEs capable of performing root cause analysis (CAUSE-ANALYS-CAPAB-CF-NODE-LIST), actions to resolve conflicts (CONFLICT-RES-ACTIONS), thresholds for minimum improvements in SLA/KPI adherence (LOWER-IMPR-THRESHOLD), thresholds for maximum improvements in SLA/KPI adherence (UPPER-IMPR-THRESHOLD), and so forth.

The PPM 201 may then perform following actions:
i) The PPM 201 may load all the above provisioned inputs into the memory of the E2ECO device 200, and may also persist them in the CDB 211 (for future use).
ii) The PPM 201 may process the current value of HLI, and may determine the set of configuration parameters (capacity limits, redundancy level, KPI thresholds (target vs actual) for triggering preventive actions, parameters to be monitored) using adaptive mapping rules ADAPT-HLI-MAPPING-RULES and using machine learning techniques such as natural language processing. It should be noted that the PPM 201 may fetch the adaptive mapping rules ADAPT-HLI-MAPPING-RULES from CDB 211. However, if this data is not present, then the PPM 201 may fetch HLI-MAPPING-RULES from memory.
   a) Further, it should be noted that, if the inputs to the PPM 201 is the events and parameters for slice types/categories (and not for each specific slice), for example, 'URLLC slice, 'eMBB slice', etc., then the PPM 201 may determine the events and parameters to be monitored for a specific slice (based on historical data) at the time of slice activation.
iii) The PPM 201 may then store the configuration parameters in memory.
iv) The PPM 201 may then trigger other modules in the E2ECO device 200 to inform them of the (updated) provisioning inputs stored in the CDB 211, and may also send the relevant configuration parameters to each of the other modules in the E2ECO device 200 (e.g., capacity limits to the FPIRM 210, SLHM 208, and SLUM 203; KPI thresholds to FPPM 209; etc.).

When the PPM 201 receives a service instantiation request via EXT1 from OSS/BSS 212 with relevant additional details such as location, network segment, or slice in which the service is to be activated, service priority, user category (USER-CLASS if applicable), etc., the following actions may be performed:
i) The PPM 201 may store the configuration parameters in memory and in the CDB 211.
ii) If the SERVICE-EVENT-PARAMS in CDB 211 contains only the events and parameters for service types/categories (and not for each specific service), for example, 'low-latency service', 'high-reliability service', etc., then the PPM 201 may determine the events and parameters to be monitored for a specific service (based on historical data) at the time of service activation.
iii) The PPM 201 may then trigger the SLHM 208 and the SLOM 203 for necessary actions to be taken for service lifecycle management and slice orchestration respectively. It should be noted that such actions may include, but may not be limited to, mapping the service to a slice, allocating appropriate resources for the service, configuring the service chain and associated resources, and so forth. The SLOM 203 may then update SERVICE-SLICE-MAPPING-TABLE with details of the slice to which the service is being mapped to, ACT-SLICES if a new slice is being instantiated for this service. The SLHM 208 may also update ACT-SERVICES with details of the new service being activated, and the network segment(s) 214 in which it is activated.
iv) The PPM 201 may trigger the CFOM 202 for activation of CFs, and may initiate subsequent actions as will be described herein below.

In some embodiments, at step 502, the CFOM 202 may perform a number of sub-steps upon receiving the relevant inputs for various service(s) and/or slice(s) from the PPM 201. These sub-steps may include, but may not be limited to, determining the sequence of CFs at step 509, determining appropriate network nodes where the CFs should be activated at step 510, defining the collaboration/inter-dependencies among one or more CFs at step 511, determining appropriate network nodes where the root cause of the fault/performance issue is to be identified at step 512, instantiating/notifying the CFs and setting-up the CF sequence at step 513.

At step 509, the CFOM 202 may determine the sequence of CFs for every service and/or slice as follows:
- a) for each service being activated, the CFOM 202 may perform following actions:
  - i) obtain the list of event-parameters (SERVICE-EVENT-PARAMS) to be analyzed for this service from the SERVICE-EVENTS-PARAMS-TABLE stored in CDB 211 for the particular service (this table is provisioned in the beginning, and subsequently updated by EAAM 205 by auto-learning);
  - ii) determine the necessity of monitoring each event-parameter in SERVICE-EVENT-PARAMS list by taking into account the following factors, and store the relevant event-parameter(s) in ADAPT-SERVICE-EVENT-PARAMS accordingly (in memory as well as in the CDB 211):
    - slice/slice type to which the service is being mapped to currently (fetched from SERVICE-SLICE-MAPPING-TABLE stored in the CDB 211);
    - SLA/KPI requirements for the service (fetched from TARGET-SLA-KPI-LIST stored in the CDB 211);
    - other services)/services type(s) that are active currently (fetched from ACT-SERVICES stored in the CDB 211);
    - other aspects associated with the service, for example, network segment(s) in which the service is active (fetched from SERVICE-NTW-SEG-MAPPING-TABLE stored in the CDB 211), class of users (USER-CLASS), etc.; and
    - service policy, if any (fetched from POCO stored in the CDB 211);
  - iii) for each event-parameter in ADAPT-SERVICE-EVENT-PARAMS, determine the associated CFs from ANALYSIS-CF-MAPPING-TABLE (fetched from the CDB 211);
  - iv) form a sequence of the CFs (for example, as a graph with each vertex denoting a CF and each edge denoting the interconnection between 2 CFs) as follows:
    - identify any dependencies in the event-parameter analysis and store in CF-SEQUENCE-SERVICES-TABLE for the service (in local memory as well as in the CDB 211).
- b) for each slice being activated, the CFOM 202 may perform following actions:
  - i) fetch the list of parameters/events (SLICE-EVENTS-PARAMS) to be analyzed for this slice. This is obtained from the SLICE-EVENTS-PARAMS-TABLE stored in the CDB 211 for the particular slice (this table is provisioned in the beginning, and subsequently updated by EAAM 205 during auto-learning phase);
  - ii) determine the necessity of monitoring each event-parameter in SLICE-EVENT-PARAMS list by taking into account the following factors, and store the relevant event-parameter(s) in ADAPT-SLICE-EVENT-PARAMS accordingly (in memory as well as in the CDB 211):
    - service/service types that are mapped to this slice currently (fetched from SERVICE-SLICE-MAPPING-TABLE stored in the CDB 211);
    - SLA/KPI requirements for the slice (fetched from TARGET-SLA-KPI-LIST stored in the CDB 211);
    - other slices that are active currently (fetched from ACT-SLICES stored in the CDB 211); and
    - other aspects associated with the slice, for example, geographical location/network segments where this slice is active (fetched from SLICE-NTW-SEG-MAPPING-TABLE stored in the CDB 211), class of users (USER-CLASS), etc.; and
  - iii) for each parameter/event in ADAPT-SLICE-EVENT-PARAMS (to be analyzed), determine the associated CFs from ANALYSIS-CF-MAPPING-TABLE;
  - iv) form a sequence of the CFs and store in CF-SEQUENCE-SLICES-TABLE for the slice (in local memory as well as in the CDB 211). Identify any dependencies in the event-parameter analysis.

At step 510, the CFOM 202 may determine the appropriate network nodes where the CFs determined (for services and slices) at step 509 may be activated as follows;
- i) For each new entry in the CF-SEQUENCE-SERVICES-TABLE/CF-SEQUENCE-SLICES-TABLE, the CFOM 202 may determine the list of nodes that are capable of performing the analysis from CF-CAPAB-TABLE (fetched from the CDB 211), taking into account service SLA, network segment(s) in which the service is active and the network segment(s) in which the capable nodes are active/can be activated. It should be noted that each CF for the new entries in CF-SEQUENCE-SERVICES-TABLE/CF-SEQUENCE-SERVICES-TABLE entry may be broken down into sub-CFs and the capable nodes may be determined. For example, if a CF comprises of a natural language processing (NLP) of a certain input, followed by a decision tree analysis, and say, Node1 is capable of performing both these, while Node2 can only perform NLP, then both nodes are included with relevant details of the parts of the analysis that they can perform. The CFOM 202 may then form the CF-POSSIB-TABLE-SERVICES and CF-POSSIB-TABLE-SLICES with the collected information for each (new) entry in the CF-SEQUENCE-SERVICES-TABLE/CF-SEQUENCES-SLICES-TABLE.
- ii) The CFOM 202 may sort the CF-POSSIB-TABLE-SERVICES and CF-POSSIB-TABLE-SLICES with the top most row occupied by the service and slice respectively, with the highest priority (service/slice priority information may be fetched from SERVICE-PRIORITY-TABLE/SLICE-PRIORITY-TABLE in the CDB 211).
- iii) The CFOM 202 may traverse the CF-POSSIB-TABLE-SERVICES/CF-POSSIB-TABLE-SLICES from the top row for each new entry and may perform the following: For each node indicated as capable of performing a certain CF, the CFOM 202 may determine suitability of a node based on:
  - a) an ability of the node to meet the required performance levels of the CF for the service/slice (latency, throughput, granularity, etc.) considering the processing speed, analysis throughput/latency of the node, and the present resource utilization levels (and feasibility to scale up resources if required). The CFOM 202 may assign a feasibility rank on a scale of e.g., 1-5 (1 being highest and 5 being lowest), wherein the assignment may be based on a weighted average of the various ability factors stated above or using more complex methods taking into consideration the exact nature of the CF in addition to its requirements, etc.

b) a reliability of the node (based on past performance). Based on historical data of the node with respect to its performance (i.e., ability to meet the performance criteria) and availability, the CFOM 202 may assign a reliability rank, e.g., 1-10 (1 being most reliable, and 10 being least reliable). The CFOM 202 may assign the reliability rank based on a step-wise approximation of the reliability (e.g., average of performance meeting criteria and availability is greater than 97% corresponding to a first rank, average of performance meeting criteria and availability is greater than 90% corresponding to a second rank, and so on), or using complex methods wherein additional factors such as the priority of the service/slice, number of CFs that were active at a given instant, etc. may also be considered in determining the rank.

The CFOM 202 may then determine a suitability rank (SUIT-RANK) on a scale of 1-5 which may be an average of the feasibility rank and the reliability rank. It should be noted that the average may be a simple average, or a complex weighted average wherein weights are determined, for example, based on service/slice priority, when the last hardware/software upgrade was done on the node, and adapted based on learning from historical data.

iv) Starting from the service/slice with the highest priority, the CFOM 202 may determine the optimal set of nodes for the CF sequence chain from the possible nodes in the CF-POSSIB-TABLE-SERVICES/CF-POSSIB-TABLE-SLICES taking into consideration:
SUIT-RANK of the node;
overall distance and associated delay expected (considering the dynamic traffic conditions and prediction in the respective network segments); and
expected end-to-end delay in the analysis.

The CFOM 202 may then form a chain with nodes having highest possible SUIT-RANK for each CF, subject to the condition that the analysis delay is less than ANALYSIS-DELAY-THRES. This optimization problem may be solved using standard constrained optimization algorithms such as branch and bound techniques or heuristic methods, or brute-force techniques such as computing all possible sequences with all nodes in CF-POSSIB-TABLE for that service and checking the constraint fulfillment starting from the sequence having the sum of the SUIT-RANKs of the nodes as the minimum. During the process of determination, if for a service/slice, a node in the CF sequence chain has a SUIT-RANK>=4, then CFOM 202 may check for the feasibility of re-assignment of nodes for other services/slices (starting from the service with the lowest priority) to enable assignment of an alternative node with SUIT-RANK<=3. After this step, the CFOM 202 may form CF-SEQ-GRAPH for every service/slice that is being instantiated.

At step 511, the CFOM 202 may determine the collaboration and inter-dependencies among the CFs based on the (cognitive) inputs required for a CF (from CF-ANALYS-INPUTS stored in the CDB 211), which would make a CF's analysis more effective. It should be noted that such collaboration and inter-dependencies among the CFs may be over and above the sequencing or chaining.

At step 512, the CFOM 202 may determine the appropriate network node(s) where root cause of (potential) fault/performance issues are to be identified as follows:

a) The CFOM 202 may fetch the list of CF-NODEs capable of performing root cause analysis (from CAUSE-ANALYS-CAPAB-CF-NODE-LIST stored in the CDB 211).

b) The CFOM 202 may form CAUSE-ANALYS-POSSIBLE-CF-NODE-LIST by copying the contents of CAUSE-ANALYS-CAPAB-CF-NODE-LIST.

c) Starting from the service/slice with the highest priority, the CFOM 202 may determine the CF-NODE to perform root cause analysis (CAUSE-ANALY-CF-NODE) as follows:

i) The CFOM 202 may select the most appropriate CF-NODE from CAUSE-ANALYS-POSSIBLE-CF-NODE-LIST that can match the latency and 'real-time' analysis requirements of the service/slice based on RCA-SUIT-RANK subject to RCA-CONDN. RCA-SUIT-RANK may be determined based on:

CAPAB-RANK, which may be determined from the analysis requirements (real-time nature, data volume, algorithm requirements, etc.), which, in turn, may be determined from the service/slice KPIs/SLAs and learning from historical data, and the capability of the CF-NODE in CAUSE-ANALYS-POSSIBLE-CF-NODE-LIST;

CF-NODE-DIST-RANK, which may be determined from the adapted distance (ADAPT-DIST) of the nodes/network sub-segments from where the input data is provided and the CF-NODE, wherein ADAPT-DIST=(the average distance of the CF-NODE from the network segments where the service is active)*DIST-FACTOR, where DIST-FACTOR=a scaling factor based on the available bandwidth and congestion levels in the path between the network segment(s) of the node(s)/network sub-segment(s) providing the inputs are present and the CF-NODE; and INPUT-DIST-RANK, which may be determined from the weighted average of distance of the CF-NODEs or any NEs providing mandatory inputs for the root cause analysis, and distance of the CF-NODEs or any NEs providing optional inputs for the root cause analysis, the weight being determined based on historical data on the probability of each of the optional nodes having to actually provide inputs. The mandatory and optional inputs may be determined using a DEC-TREE which may be pre-provisioned in the beginning, and then adapted based on self-learning.

RCA-SUIT-RANK may be determined as a simple average of the normalized CAPAB-RANK, CF-NODE-DIST-RANK, and INPUT-DIST-RANK (normalization may be performed to convert all the ranks to the same scale), or complex computations such as weighted averages with weights determined using additional factors such as the nature of the service, priority, effectiveness of the CF-NODE, etc.). The CF-NODE with the highest RCA-SUIT-RANK may be then selected as the CAUSE-ANALY-CF-NODE.

RCA-CONDN may be the list of mandatory KPI/SLAs associated with the service/slice, and may also include the threshold value of RCA-SUIT-RANK below which a CAUSE-ANALY-CF-NODE may not be selected.

ii) After selecting the appropriate CAUSE-ANALY-CF-NODE, the CFOM 202 may determine the expected resource occupancy level (after possible scaling, if required) and expected performance level of that CAUSE-ANALY-CF-NODE. If either of them is greater than pre-provisioned threshold value, the CFOM 202 may remove the CF from CAUSE-ANALYS-POSSIBLE-CF-LIST before following the same steps for the service/slice with the next priority.

iii) During the assignment of the CAUSE-ANALY-CF-NODE for any service, in case it is not possible to assign any CAUSE-ANALY-CF-NODE, the CFOM 202 may do the following:

The CFOM 202 may determine if CAUSE-ANALY-CF-NODE for the service/slice may be assigned from the list of CAUSE-ANALYS-POSSIBLE-CF-NODE-LIST by re-assignment of CAUSE-ANALY-CF-NODE to another (less) suitable node for a service/slice with lower priority;

If above is also not feasible, then the CFOM 202 may determine possibility of splitting the root cause analysis into two nodes within CAUSE-ANALYS-CAPAB-CF-LIST, and analysis may be combined at the CFOM 202 (while meeting the latency and other criteria).

d) The CFOM 202 may then update CF-SEQ-GRAPH for all impacted services and slices.

e) The CFOM may then store the details of the CAUSE-ANALY-CF-NODE along with the details of the mandatory and optional inputs that may be considered for the root cause analysis of issues for that particular service/slice in memory as well as in the CDB 211.

At step 513, the CFOM 202 may trigger instantiation/activation of the CFs for the required services/slices, and setting-up the CF sequence.

In some embodiments, after the CFs in the CFs-NODEs are activated (including root cause analysis), at step 503, the CFOM 202 may trigger the MONIM 207 to monitor the performance of the services and slices with respect to the KPIs/SLAs, as well as the performance of the CF-NODEs. The MONIM 207 may perform this monitoring by collecting relevant data from the NEs including the CF-NODEs. This data may be raw fault, event, and performance data or may be processed information such as KPI adherence levels, performance trends, prediction of fault or performance issues from a CF, and so forth.

In some embodiments, at step 504, the MONIM 207 may extract relevant information from the information reported by the CFs and various NEs in the network (including alarms, events, service/slice SLA/KPI trends, etc.). The MONIM 207 may then pass the relevant information to the FPPM 209 after appropriate pre-processing. The extraction and pre-processing may be based on pre-provisioned rules. For example, the pre-provisioned rules may include, but may not be limited to, aggregation of performance trends over a pre-defined interval, consolidation of all events from a network segment (coming from different NEs) when a fault is reported in that network segment, reconciling differences in reported performance data using pre-provisioned rules on how to resolve differences (e.g., take a weighted average with weights based on the confidence level of the data reported by a NE, input from a certain NE superseding other NEs, etc.), and so forth. The MONIM 207 may also collect data on the ACTUAL-SLA-KPIs (and associated trends) of various services and slices, and may store them in the memory as well as persists them in the CDB 211.

In some embodiments, at step 505, the FPPM 209 may detect fault/performance issue(s) in one or more services/slices, using pre-provisioned inputs which were then adapted by EAAM 205 based on learning (examples of such adaptations are provided in greater detail at step 508). In some embodiments, the detection may involve comparing the reported data against thresholds, for example, end-to-end latency within the network shows an increasing trend, and is predicted to cross the threshold for maximum latency in next 2 observation intervals (e.g., in 10 minutes). However, in some embodiments, the detection may also involve complex steps such as multi-step and multi-parameter correlation, multi-variable regression, and so forth.

Upon detecting/predicting a fault/performance issue in one or more services/slices, the FPPM 209 may trigger the appropriate CAUSE-ANALY-CF-NODE for that service/slice for performing causal analysis (CAUSE-ANALY-CF-NODE information may be fetched from the CDB 211). The CAUSE-ANALY-CF-NODE may perform causal analysis using any of the well-known or proprietary techniques to arrive at the root cause(s). These techniques may include, but may not be limited to, decision trees, deep learning, artificial neural networks, deep neural networks, and so forth. In some embodiments, the CAUSE-ANALY-CF-NODE may request for additional information which may include inputs from other CFs or other CAUSE-ANALY-CF-NODEs. The FPPM 209 may pass such a request to the CFOM 202. The CFOM 202 may then trigger the relevant CFs/CAUSE-ANALY-CF-NODEs to share the required inputs, and may also store relevant information in COLLAB-INPUTS in the CDB 211. Once the CAUSE-ANALY-CF-NODE may respond with the root cause(s), the FPPM 209 may determine if this would impact other service(s)/slice(s) by doing one or more of the following:

a) checking if the resources involved are also used by other service(s)/slice(s) (e.g., shared resources, common incoming link for all packets in the network, etc.);

b) adverse effects of this service/slice issue impact other services)/slice(s), for example, higher latency for packets outflowing from a network segment for a service could lead to queue buildup in the preceding network segment, thereby impacting service(s)/slice(s) using the preceding network;

c) addressing security vulnerabilities in the network which could impact other services (e.g., if a firewall is impacted); and so forth.

The FPPM 209 may then trigger the FPIRM 210 for appropriate actions to be taken with the relevant information of the cause(s), impacted services)/slice(s) along with the impact details.

In some embodiments, at step 506, the FPIRM 210 may perform a number of sub-steps upon receiving a trigger from the FPPM 209 for resolving a fault/performance issue (in a service/slice). These sub-steps may include, but may not be limited to, determining possible resolutions for the fault/performance issue at step 514, determining most appropriate resolutions at step 515, determining if determined resolution addresses all services)/slice(s) having the fault/performance issue at step 516, examining alternatives and finalizing resolution that addresses all impacted services)/slice(s) at step 517, determining impact of resolution actions on other service(s)/slice(s) that are not impacted by the fault/performance issue at step 518, and determining appropriate preventive/corrective actions at step 519. If the outcome of these sub-steps 514-519 is that a common resolution cannot be implemented for all impacted services)/slice(s), then these sub-steps 514-519 may be performed for each of the impacted service/slice one by one.

At step 514, the FPIRM 210 may determine the possible resolutions on the causal analysis output from the CAUSE-ANALY-CF-NODE (forwarded by the FPPM 209) using ADAPTED-RES-RULES. The CAUSE-ANALY-CF-NODE may also send some resolution alternatives, if it is able to determine, based on the causal analysis outcome. For example, if the causal analysis indicates that the root cause is within a network segment due to a node which is failing/degrading in performance, it may suggest alternative path for the service flow, spawning another instance of the failing node, etc., based on provisioned inputs. The FPIRM 210 may consult ADAPTED-RES-RULES, may check policy constraints and dynamic network conditions, capacity limits, etc., and may determine/shortlist possible alternatives from the list of available alternatives.

For example, if the root cause for service KPI degradation is within a network segment due to a node which is failing/degrading in performance, the FPIRM 210 may perform the following:

Fetch the list of possible resolutions from ADAPTED-RES-RULES and the inputs provided by the CAUSE-ANALY-CF-NODE.

Check if policy allows the service to be routed via an alternative path via another node performing the same function. If not allowed, the FPIRM 210 may remove routing of the service via an alternative path from the list of possible resolution actions. If allowed, the FPIRM 210 may check feasibility of alternative paths by comparing the SLAs/KPIs with the latency, cost and other parameters. If not feasible, the FPIRM 210 may remove routing of the service via an alternative path from the list of possible resolution actions.

Check if sufficient resources are available for spawning a new instance of the failing node (in the appropriate location/network segment), and if not available, remove this option from the list of possible resolution actions.

Determine if the functions performed by the node for this particular service (e.g., deep packet inspection, packet content modification, session setup, etc.) can be performed by one or more other nodes and it is feasible to transfer the functionality seamlessly to those node(s), by checking the capability of the involved nodes for seamless transfer, connectivity status between those nodes, dynamic network conditions, etc. If it is not feasible, the FPIRM 210 may remove this option from the list of possible resolution actions.

Check if the node is performing a non-critical function (e.g., an optional function such as video optimization), and the impact of removing it from the service flow path is within acceptable limits. In case it is not acceptable to remove it, the FPIRM 210 may remove this option from the list of possible resolution actions.

A similar kind of analysis based on ADAPTED-RES-RULES, slice/service KPIs, dynamic network conditions, resource availability and policy shall be performed for other root causes. The FPIRM 210 may store the determined set of alternatives in RES-OPTIONs, wherein each RES-OPTION may actually comprise a set of actions.

At step 515, the FPIRM 210 may determine the most appropriate solution from the list of RES-OPTIONS using a mechanism such as the following:

a) Rank RES-OPTIONS in descending order based on the ADAPT-SUIT-SCORE
where ADAPT-SUIT-SCORE=SUIT-SCORE*DYN-NET-CTXT-FACTOR, where SUIT-SCORE is fetched from the CDB 211, and where DYN-NET-CTXT-FACTOR is determined based on a combination of the parameters including, but not limited to:

i) RES-FACTOR, whose value depends on the RES-OPTION needing additional resources (e.g., scaling up) and availability of relevant network resources, for example, if RES-OPTION needs additional resources, and resources are sufficiently available, then, say, RES-FACTOR=0.7, if the RES-OPTION does not need any additional resources, then, RES-FACTOR=1, and so on;

ii) MOB-FACTOR, whose value depends on the current mobility levels required by the service, KPIs of the service (latency, throughput, reliability), and nature of solution option, for example, high-mobility required and RES-OPTION is a static alternative path=>MOB-FACTOR=0.3, high-mobility and RES-OPTION is removal of an unwanted node=>MOB-FACTOR=0.9, and so on;

iii) CTXT-FACTOR, whose value depends on the KPIs of the service (latency, throughput, reliability), dynamic network conditions, nature of solution option and probability (computed based on historical data) that it will help meet all the service KPIs (i.e., while fixing a predicted issue, say in latency KPI, it should not result in an issue for another KPI, say, throughput). Based on historical data on the mapping between the probability of a solution introducing a KPI issue, and applicable KPIs of the service, the value of CTXT-FACTOR is determined, say, on a scale of 0-1. For example, if the RES-OPTION suggests switching the access type from Wi-Fi to 5G to address a coverage issue impacting throughput for a low-latency service, and the 5G access doesn't have a suitable slice or is already congested, then such a RES-OPTION would have an impact on latency KPI of the service. In such a case, CTXT-FACTOR would be <0.5; and iv) SEC-FACTOR, whose value depends on the security level required by the service, location and environment, for example, service requires high security, but the RES-OPTION proposes an unlicensed spectrum access use with minimal security=>SEC-FACTOR=0.3.

The value mapping for above factors (RES-FACTOR, MOB-FACTOR, CTXT-FACTOR and SEC-FACTOR) may be provisioned initially and then adapted based on learning, and they may be stored in the CDB 211. DYN-NET-CTXT-FACTOR may be determined simply as an average of the above factors, or using more complex mechanisms such as weighted averages, with weights computed using complex techniques considering service priority, (class of) user priority, service revenues, etc.

b) Check for feasibility of implementation of the RES-OPTION starting with the one having the highest ADAPT-SUIT-SCORE. Choose the RES-OPTION with the highest ADAPT-SUIT-SCORE and is feasible to be implemented and store it in DET-RES-OPTION. Feasibility check is done by:

i) Triggering the CFCCRM 204 to check if the RES-OPTION is in conflict with:

Another action(s) (e.g., scaling down is in conflict with scaling up action) carried for that service/resources associated with that service within an ACTION-TIME-WINDOW (fetched from CDB 211) using OPP-ACTS-TABLE (which may be provisioned by the operator, and subsequently adapted based on auto-learning). In this step, the CFCCRM may perform deeper analysis based on the impacted SLA/KPI of the service to determine if the action is really in conflict, for e.g., RES-OPTION to choose a longer service path in case of outage of a node may not be in conflict with an action (carried out during ACTION-TIME-WINDOW) to shorten the service path, however, RES-OPTION to choose a longer service path to address reliability issue may be in conflict with an action (carried out during ACTION-TIME-WINDOW) to choose a shorter service path to address latency issue.

Another action(s) carried out for addressing issues in other service(s)/slice(s), similar to what is explained in (i) above The CFCCRM 204 may employ techniques such as deep learning for above analysis.

ii) Checking resource availability and policy constraints relevant to the RES-OPTION, and iii) Checking dynamic network conditions relevant to the RES-OPTION (e.g., congestion level in network segments where the service flow may be moved, latency of implementation in case of scaling should be less than the time the service KPI degrades below threshold).

At step 516, the FPIRM 210 may check if the DET-RES-OPTION addresses all impacted service(s)/slice(s), based on the inputs received from FPPM 209 (which services/slices are impacted by the root cause), as follows:

For each impacted service/slice, the FPIRM 210 may perform the following:

Determine if the actions in DET-RES-OPTION addresses the impact by determining the relevant KPIs/SLAs of the affected services assuming the DET-RES-OPTION is implemented (with the help of FPPM 209 and/or appropriate CFs, etc., if needed).

Store the details in IMPACT-ADDR-TABLE.

If the DET-RES-OPTION addresses the impacts in all affected service(s)/slice(s), then the FPIRM 210 may directly perform step 518 below, otherwise, it may perform step 517 prior to performing step 518.

At step 517, the FPIRM 210 may fetch the next best resolution option based on the ADAPT-SUIT-SCORE determined in step 515 above. This resolution now becomes DET-RES-OPTION. The FPIRM 210 may then carry out the same analysis for this DET-RES-OPTION as described in step 516. The FPIRM 210 may continue this process until it finds a DET-RES-OPTION that addresses impacts in all affected services, or if there are no more RES-OPTIONs (determined in step 516). Upon exhausting all available RES-OPTIONs with none of them addressing all impacts, the FPIRM 210 may choose the RES-OPTION that:

a) addresses the most impacts, by checking the entries in IMPACT-ADDR-TABLE. For the impacts which are not effectively addressed by the RES-OPTION, the FPIRM 210 may send a notification to FPPM 209. The FPPM 209 may then trigger FPIRM 210 again, (i.e., starting from step 514) for each of the impacted service(s)/slice(s); or b) ignore the feasibility check failure due to conflict reported by CFCCRM 204 and determine DET-RES-OPTION as per step 515 (and continue further if needed as per step 517). The FPIRM 210 may trigger CFCCRM 204 to address the conflicts arising out of implementing the DET-RES-OPTION. The CFCCRM 204 may determine appropriate corrective actions with the help of CAUSE-ANALY-CF-NODE, information in CONFLICT-RES-ACTIONS, context (location, mobility, etc.) and other inputs using techniques such as deep learning.

At step 518, the FPIRM 210 may determine the impact of the chosen DET-RES-OPTION to all other active service(s)/slice(s) by checking the relevant KPIs/SLAs of relevant services/slices assuming the DET-RES-OPTION is implemented (with the help of FPPM 209 and/or appropriate CFs, etc., if needed). The FPIRM 210 may then prepare IMPACT-DET containing the details of the impacted services/slices and the associated impacts, for those impacts which are greater than pre-provisioned thresholds (e.g., a>10% increase in latency is considered to be an impact to be addressed).

At step 519, the FPIRM 210 may examine the alternatives in RES-OPTIONS that would cause minimal impact to other service(s)/slices. Note that this action may require iteration of steps 517, 518, and 519. This action may be done only if one service/slice was impacted due to the determined root cause originally, or it may be done even if multiple service(s)/slice(s) were impacted. In some embodiments, if the latency for such an analysis would take >threshold value (adapted/provisioned value and stored in the CDB 211), and the impacted service/slice is critical/high-priority, this analysis may be skipped.

For each of the impacts in IMPACT-DET, the FPIRM 210 may check if there is any preventive/corrective action using pre-provisioned inputs. If none is found, the FPIRM 210 may triggers the CFCCRM 204. The CFCCRM 204 may, in turn, trigger the CAUSE-ANALY-CF-NODE for the impacted services/slices for possible actions to address the impact. Subsequently, the CFCCRM 204 may determine possible preventive/corrective actions to address the conflict using the inputs from CAUSE-ANALY-CF-NODEs, CONFLICT-RES-ACTIONS (fetched from the CDB 211) and context (location, user class, mobility, etc.), dynamic network conditions in each of the impacted network segments. The CFCCRM 204 may then inform the FPIRM 210 of the determined preventive/corrective actions.

In some embodiments, at step 507, the FPIRM 210 may provide the determined resolution actions to SLOM 203 or RORM 206 as appropriate (e.g., the SLOM 203 may be triggered if a scaling of a subnet has to be done, while the RORM 206 may be triggered if a resource re-allocation has to be done or a service path needs to be altered). The SLOM/RORM 203/206 may then initiate appropriate actions to be implemented in the relevant network segment(s)/slice(s). The FPIRM 210 may also provide the actions determined by CFCCRM 204 to address impacts in other services/slices to SLOM 203 or RORM 206 as appropriate. The SLOM/RORM 203/206 may then initiate appropriate actions to be implemented in the relevant network segment(s)/slice(s).

In some embodiments, at step 508, the EAAM 205 may assess effectiveness of the implemented resolution and may perform various adjustments based on the learning. For example,
- a) The EAAM 205 may obtain the performance information from ACTUAL-SLA-KPI for active services and slices from the CDB 211 for a pre-specified period of time (PERF-OBS-WINDOW). The PERF-OBS-WINDOW may be specified as part of provisioned inputs and may be fetched from the CDB 211.
- b) The EAAM 205 may then compare the ACTUAL-SLA-KPI with the TARGET-SLA-KPI for each of the active services/slices, and may also compare it with the corresponding values at the start of the PERF-OBS-WINDOW (stored in the CDB 211).
- c) For each of the services/slices for which the improvement is less than LOWER-IMPR-THRESHOLD (fetched from the CDB 211) and for each of the TARGET-SLA-KPIs, the EAAM 205 may perform the following:
  - i) The EAAM 205 may perform causal analysis (e.g., using decision trees) to account for change in context (service characteristics, user density, location) and network conditions, and to conclude that the resolution was not effective.
  - ii) If the causal analysis indicates resolution was less effective, the EAAM 205 may adapt the SUIT-SCORE value for the resolution. If causal analysis indicates resolution was totally ineffective or caused a negative effect, the EAAM 205 may modify this rule in ADAPTED-RES-RULES for the performance/fault issue based on which part of the resolution went wrong, or may completely remove this resolution in ADAPTED-RES-RULES.
  - iii) If the SLA/KPI issue towards which the resolution was targeted was addressed effectively, but caused a negative impact in another SLA/KPI, then the EAAM 205 may adapt the SUIT-SCORE value for the resolution accordingly, and may also modify the rules in ADAPTED-RES-RULES to consider the degraded SLA/KPI also when selecting this resolution option.
- d) For each of the services/slices for which the improvement is greater than UPPER-IMPR-THRESHOLD (fetched from the CDB 211) for one or more of the TARGET-SLA-KPIs, the EAAM 205 may increase the SUIT-SCORE appropriately (e.g., increasing the SUIT-SCORE by a fixed incremental value, etc.; increasing the SUIT-SCORE based on a weighted average of the number of SLAs/KPIs that improved beyond UPPER-IMPR-THRESHOLD, with the weights determined based on the actual improvement, etc.).
- e) The EAAM 205 may also collect information of SLA/KPI trends of services/slices which deteriorated after implementing the resolution. The EAAM 205 may perform causal analysis by examining events and parameters that were collected (but not monitored) and contained information of this impending deterioration. Based on this analysis, the EAAM 205 may update SERVICE-EVENTS-PARAMS-TABLE and SLICE-EVENTS-PARAMS-TABLE accordingly for more effective monitoring and timely prediction of impending fault and performance issues. Such a modification may be, for example, (a) including a new event-parameter to be monitored, and (b) increasing the frequency/granularity of monitoring. For example, if a queue buildup event was reported from a access network node but never considered, and it resulted in deteriorating latency KPI trend, or drop in throughput, this event may be then included in the list of events to be monitored.
- f) The EAAM 205 may also check the conformance of the network to the HLI provisioned by the operator: in case there is a deviation, it modifies the HLI-MAPPING-RULES appropriately based on the effectiveness of the resolution actions. For example, HLI=optimize network resources while adhering to SLAs of services/slices. A resolution action's effectiveness was >90% (it mitigated the issue 90%), however, additional network resources were required (beyond initially provisioned thresholds), then the EAAM 205 may modify the thresholds for resource allocation accordingly.
- g) The EAAM 205 may also assess the effectiveness of the conflict resolution actions implemented based on recommended by the CFCCRM 204. If the conflict resolution actions were not effective (determined by examining the SLA/KPI trend of the service/slice which encountered the conflict, and using the causal analysis done in (a) above), the EAAM 205 may adapt the CONFLICT-RES-ACTIONS accordingly using the data observed during the PERF-OBS-WINDOW, historical data and using deep learning or other artificial intelligence techniques.
- h) The EAAM 205 may also adapt various thresholds (e.g., thresholds for KPI improvements, thresholds for initiating resolution actions, etc.) based on the observations during the PERF-OBS-WINDOW. For example, if the SLA/KPI deteriorated or the service failed before the resolution could be implemented, the threshold for initiating resolution action may be adjusted (which may be, for example, adjusting the slope/trend threshold for say, latency KPI).
- i) The EAAM 205 may also determine the performance levels of the CFs, CAUSE-ANALY-CF-NODEs—resource occupancy, adherence to performance KPIs (e.g., ANALYSIS-DELAY-THRES), and may adapt the capability and reliability scores of the corresponding nodes accordingly. The EAAM 205 may also examine COLLAB-INPUTS, and may perform necessary modifications to CF-ANALYS-INPUTS in CDB 211 for future use.

Thus, the techniques described in the embodiments discussed above provide for end-to-end, service-agnostic, slice-agnostic, and impact-aware resolution of fault/performance issue using cognitive means for effective SLA maintenance. As described in detail above in conjunction with FIGS. 2-5, in some embodiments, this may be achieved as follows:
- a) End-to-end SLA maintenance using CFs by predicting/determining a fault/performance issue and its underlying causes related to a service across all relevant network subnets and network slice subnets by the FPPM 209 (with the help of CAUSE-ANALY-CF-NODE), as described in the step 505. The FPPM 209 may predict/determine the fault/performance issue by using insights obtained from multiple CFs in relevant network subnets and network slice subnets. It should be noted that such insights may also be used to arrive at deeper insights, which may aid in determination of effective resolution actions from an end-to-end perspective for the fault/performance issue.
- b) Identification of fault/performance issues affecting one or more services (end-to-end) and/or network slice subnets (end-to-end) by the FPPM 209 as described in the step 505. The FPPM 209 may identify the fault/ performance issues by analyzing relevant inputs and insights from relevant network subnets and network slice subnets. In particular, the FPPM 209 may check common resources used across service(s)/slice(s), and adverse effects of an issue in a service slice impacting other service/slices.

c) Determination of impact-aware resolution for identified faults/performance issues by:
  i) Determining possible resolution(s) for the identified fault/performance issues using relevant deeper insights by the FPIRM 210, as described in step 514. The FPIRM 210 may determine possible resolution(s) by checking capacity limits and resource availability, dynamic network conditions and implementation feasibility, and determining appropriate resolution(s) based on a suitability score.
  ii) Assessing the impacts of determined possible resolution(s) on one or more other services and/or one or more network slice subnets by the FPIRM 210, as described in steps 517 and 518. The FPIRM 210 may assess the impacts by taking into consideration the network conditions, KPI(s) and performance levels of these service(s) and slice(s), and a set of adapted rules and thresholds.
  iii) Identifying the most effective resolution that has least (negative) impacts on other service(s), same and/or other slice(s) by the FPIRM 210, as described in step 519. The FPIRM 210 may identify the most effective resolution by iteratively determining the impacts and preventive/corrective actions of all the determined possible resolution(s).

d) Effective end-to-end orchestration involving interconnected CFs by:
  i) Determining appropriate network nodes where a fault/performance issue is to be identified, and corresponding resolution are to be determined by the CFOM 202, as described in step 502. In particular, the CFOM 202 may determine appropriate places where the relevant CFs should be activated by taking into consideration dynamic network conditions, service characteristics (KPIs, mobility requirements, etc.).
  ii) Enabling collaboration among CFs of different nodes in same/different network subnets or network slice subnets by the CFOM 202, as described in step 502. The collaboration enables sharing of insights/information generated by these CFs.
  iii) Performing orchestration related to minimizing negative impact of a resolution on other services, same and/or other network slice subnets by the FPIRM 210, as described in steps 505 and 506. The FPIRM 210 may perform orchestration by triggering appropriate preventive/corrective actions.

e) Assessment of effectiveness of the orchestration performed by the E2ECO device 200 by the EAAM 205, as described in step 508. Such assessment may include, but may not be limited to, appropriate instantiation of CFs, impact(s) of the resolution(s) applied on one service/slice on other services/slices, or appropriate determination of faults/performance issues affecting more than one service.

f) Improvement of the effectiveness of the orchestration performed by the E2ECO device 200 by the EAAM 205, as described in step 508. The EAAM 205 may improve the effectiveness by making necessary self-adaptations to the cognitive orchestration mechanism (thresholds, rules, etc.) based on the assessment of the effectiveness achieved at (e).

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above provide for effective orchestration of CFs in a distributed heterogeneous communication network (e.g., next-generation communication network) so as to maintain SLA. In particular, the techniques provide for an end-to-end, service-agnostic, slice-agnostic, impact-aware, and orchestrated resolution of fault/performance issue using cognitive means for effective SLA maintenance under the circumstances of adverse network conditions, Additionally, the techniques provide for dynamic adaptable rules and account for impact on other services(s)/slice(s).

The specification has described system and method for performing effective orchestration of CFs in a distributed heterogeneous communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), readonly memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing orchestration of cognitive functions for maintaining end-to-end Service Level Agreement (SLA) associated with a set of network slices in a distributed heterogeneous communication network, the method comprising:
    determining, by an end-to-end cognitive orchestration (E2ECO) device, a fault or a performance issue and one or more associated causes, related to a particular network slice in the set of network slices in the distributed heterogeneous communication network, using one or more cognitive functions associated with each of the set of network slices, during an adverse network condition;
    determining, by the E2ECO device, one or more possible resolutions for the fault or the performance issue related to the particular network slice, based on the one or more associated causes;
    identifying, by the E2ECO device, a resolution by evaluating each of the one or more possible resolutions for: (a) a suitability of each of the one or more possible resolutions to an affected network segment of the particular network slice and (b) an impact of each of the one or more possible resolutions on other network slices in the set of network slices, wherein identifying the resolution comprises:
        evaluating, for each of the one or more possible resolutions, the impact on other network slices based on: (a) network condition, (b) a set of key performance indicators (KPI's) associated with latency, throughput, and reliability, and (c) an associated performance level required by each of the other network slices, wherein each of the other network slices is in adherence to end-to-end SLA requirements with the particular network slice in the distributed heterogeneous communication network; and
        determining one or more potential conflicts between a previous action performed on the particular network slice within a pre-defined time period and possible resolutions associated with the particular network slice; and
    implementing, by the E2ECO device, the resolution on the affected network segments of the particular network slice.

2. The method of claim 1, further comprising determining the one or more cognitive functions associated with each of the set of network slices by:
    determining a set of KPI's associated with a service or a network slice upon activating the network slice;
    determining a set of parameters to be monitored to compute the set of KPI's; and
    determining the one or more cognitive functions based on the set of parameters to be monitored.

3. The method of claim 1, further comprising activating and monitoring each of the one or more cognitive functions by:
    determining a set of optimal network nodes from among a set of capable network nodes for activating a cognitive function based on at least one of a priority of a service supported by each network slice, a priority of a slice, interdependencies among the one or more cognitive functions, collaboration among the one or more cognitive functions, a possible fault, or a possible performance issue; and
    activating and monitoring the cognitive function in the set of optimal network nodes.

4. The method of claim 1, wherein determining the fault or the performance issue and the one or more associated causes comprises:
    aggregating a set of events or a set of performance trends over a pre-defined period of time; and
    determining the fault or the performance issue and the one or more associated causes by evaluating the set of events or the set of performance trends.

5. The method of claim 1, wherein determining the one or more possible resolutions comprises determining the one or more possible resolutions based on a set of pre-defined rules, a set of policy constraints, a dynamic network condition, an availability of each of one or more required resources, and the set of associated KPI's.

6. The method of claim 1, wherein identifying the resolution further comprises determining a suitability score of a possible resolution, wherein the suitability score is indicative of the suitability of the possible resolution.

7. The method of claim 1, wherein identifying the resolution further comprises assessing, for each of the set of network slices, the impact of a possible resolution on a network slice based on a set of target KPI's for the network slice upon implementing the possible resolution.

8. The method of claim 1, wherein identifying the resolution further comprises identifying a possible resolution with a high suitability and at least one of a low impact on or a low conflict with between the particular network slice and the other network slices in the set of network slices.

9. The method of claim 1, further comprising:
    assessing an effectiveness of the implementation by comparing a set of actual KPI's with a set of corresponding target KPI's for the set of network slices; and
    performing tuning of at least one of: a set of pre-defined rules for identifying the resolution, a plurality of assessment parameters for identifying the resolution, and a set of pre-defined rules for determining optimal network nodes.

10. A system for performing orchestration of cognitive functions for maintaining end-to-end Service Level Agreement (SLA) associated with a set of network slices in a distributed heterogeneous communication network, the system comprising:
    an end-to-end cognitive orchestration (E2ECO) device comprising:
        at least one processor configured to execute a set of instructions for providing:
            a cognitive function orchestration module (CFOM) for determining one or more cognitive functions associated with each of a set of network slices in the distributed heterogeneous communication network;
            a fault and performance prediction module (FPPM) for determining a fault or a performance issue and one or more associated causes, related to a particular network slice in the set of network slices, using one or more cognitive functions associated with each of the set of network slices, during an adverse network condition;
            a fault and performance issue resolution module (FPIRM) for:
                determining one or more possible resolutions for the fault or the performance issue related to the particular network slice, based on the one or more associated causes; and identifying a resolution by evaluating each of the one or more possible resolutions for: (a) a suitability of each of the one or more possible resolutions to an affected network segment of the particular network slice and (b) an impact of each of the one or more possible resolutions on other network slices in the set of network slices, wherein identifying the resolution comprises:

evaluating, for each of the one or more possible resolutions, the impact on other network slices based on: (a) network condition, (b) a set of key performance indicators (KPI's) associated with latency, throughput, and reliability, and (c) an associated performance level required by each of the other network slices, wherein each of the other network slices is in adherence to end-to-end SLA requirements with the particular network slice in the distributed heterogeneous communication network; and determining one or more potential conflicts between a previous action performed on the particular network slice within a pre-defined time period and possible resolutions associated with the particular network slice; and a resource orchestration module (RORM) for:
implementing the resolution on the affected network segments of the particular network slice; and at least one computer-readable medium that stores the set of instructions, configuration data, fault or performance data, rules data, and threshold data.

11. The system of claim 10, wherein the CFOM determines the one or more cognitive functions associated with each of the set of network slices by:
determining a set of KPI's associated with a service or a network slice upon activating the network slice;
determining a set of parameters to be monitored to compute the set of KPI's; and
determining the one or more cognitive functions based on the set of parameters to be monitored.

12. The system of claim 10, wherein the CFOM is further configured for activating and monitoring each of the one or more cognitive functions by:
determining a set of optimal network nodes from among a set of capable network nodes for activating a cognitive function based on at least one of a priority of a service supported by each network slice, a priority of a slice, inter-dependencies among the one or more cognitive functions, collaboration among the one or more cognitive functions, a possible fault, or a possible performance issue; and
activating and monitoring the cognitive function in the set of optimal network nodes.

13. The system of claim 10, wherein the FPPM determines the fault or the performance issue and the one or more associated causes by:
aggregating a set of events or a set of performance trends over a pre-defined period of time; and
determining the fault or the performance issue and the one or more associated causes by evaluating the set of events or the set of performance trends.

14. The system of claim 11, wherein the FPIRM determines the one or more possible resolutions based on a set of pre-defined rules, a set of policy constraints, a dynamic network condition, an availability of each of one or more required resources, and the set of associated KPI's.

15. The system of claim 10, wherein the FPIRM identifies the resolution by determining a suitability score of a possible resolution, wherein the suitability score is indicative of the suitability of the possible resolution.

16. The system of claim 10, wherein the FPIRM identifies the resolution by assessing, for each of the set of network slices, the impact of a possible resolution on a network slice based on a set of target KPI's for the network slice upon implementing the possible resolution.

17. The system of claim 10, wherein the at least one processor is further configured for:
providing at least one of a slice orchestration module (SLOM), a service lifecycle handling module (SLHM), or a resource orchestration module (RORM) for implementing the resolution on one or more affected network segments of the set of network slices, and wherein the at least one processor is further configured for providing an effectiveness assessment and adaptation module (EAAM) for:
assessing an effectiveness of the implementation by comparing a set of actual KPI's with a set of corresponding target KPI's for the set of network slices; and
performing tuning of at least one of: a set of pre-defined rules for identifying the resolution, a plurality of assessment parameters for identifying the resolution, and a set of pre-defined rules for determining optimal network nodes.

18. A non-transitory computer-readable medium storing computer-executable instructions configured for:
determining a fault or a performance issue and one or more associated causes, related to a particular network slice in a set of network slices in the distributed heterogeneous communication network, using one or more cognitive functions associated with each of the set of network slices, during an adverse network condition, wherein the one or more cognitive functions that are used for maintaining end-to-end Service Level Agreement (SLA) associated with each of the set of network slices;
determining one or more possible resolutions for the fault or the performance issue related to the particular network slice, based on the one or more associated causes;
identifying a resolution by evaluating each of the one or more possible resolutions for: (a) a suitability of each of the one or more possible resolutions to an affected network segment of the particular network slice and (b) an impact of each of the one or more possible resolutions on other network slices in the set of network slices, wherein identifying the resolution comprises:
evaluating, for each of the one or more possible resolutions, the impact on other network slices based on: (a) network condition, (b) a set of key performance indicators (KPI's) associated with latency, throughput, and reliability, and (c) an associated performance level required by each of the other network slices, wherein each of the other network slices is in adherence to end-to-end SLA requirements with the particular network slice in the distributed heterogeneous communication network; and
determining one or more potential conflicts between a previous action performed on the particular network slice within a pre-defined time period and possible resolutions associated with the particular network slice; and implementing the resolution on the affected network segments of the particular network slice.

* * * * *